(12) United States Patent
Levinson

(10) Patent No.: US 7,468,729 B1
(45) Date of Patent: Dec. 23, 2008

(54) USING AN AVATAR TO GENERATE USER PROFILE INFORMATION

(75) Inventor: David S. Levinson, Round Hill, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 589 days.

(21) Appl. No.: 11/017,240

(22) Filed: Dec. 21, 2004

(51) Int. Cl.
*G06T 15/70* (2006.01)

(52) U.S. Cl. ............... 345/473; 345/419; 709/204; 715/500.1; 715/706; 715/850

(58) Field of Classification Search ........... 345/419, 345/473; 715/706, 850; 709/204
See application file for complete search history.

(56) References Cited

U.S. PATENT DOCUMENTS

| | | | |
|---|---|---|---|
| 5,710,884 | A | 1/1998 | Dedrick |
| 5,761,662 | A | 6/1998 | Dasan |
| 5,793,365 | A | 8/1998 | Tang et al. |
| 5,796,948 | A | 8/1998 | Cohen |
| 5,835,722 | A | 11/1998 | Bradshaw et al. |
| 5,848,396 | A | 12/1998 | Gerace |
| 5,880,731 | A | 3/1999 | Liles et al. |
| 5,884,029 | A | 3/1999 | Brush, II et al. |
| 5,894,305 | A | 4/1999 | Needham |
| 5,963,217 | A | 10/1999 | Grayson |
| 6,091,410 | A | 7/2000 | Lection et al. |
| 6,115,709 | A | 9/2000 | Gilmour et al. |
| 6,128,739 | A | 10/2000 | Fleming, III |
| 6,185,614 | B1 | 2/2001 | Cuomo et al. |
| 6,205,478 | B1 | 3/2001 | Sugano et al. |
| 6,219,045 | B1 | 4/2001 | Leahy et al. |
| 6,253,202 | B1 | 6/2001 | Gilmour |
| 6,256,633 | B1 | 7/2001 | Dharap |
| 6,331,853 | B1 | 12/2001 | Miyashita |
| 6,349,327 | B1 | 2/2002 | Tang et al. |

(Continued)

FOREIGN PATENT DOCUMENTS

WO     WO 00/68815     11/2000

(Continued)

OTHER PUBLICATIONS

Salem, B. et al.; "Designing a Non-Verbal Language for Expressive Avatars"; Collaborative Virtual Environments; University of Plymouth, ISBN: 1-58113-303-0; pp. 93-101 (2000).

(Continued)

*Primary Examiner*—Kimbinh T Nguyen
(74) *Attorney, Agent, or Firm*—Fish & Richardson P.C.

(57) ABSTRACT

An instant messaging user may be represented in communications with other users by an avatar that is capable of being animated or may convey information about the user by displaying other types of self-expression items, such as non-animated icons, sounds, wallpaper, or objects associated with an avatar or wallpaper. In such a case, the avatar and self-expression items may have characteristics that relate to information that corresponds to or represents the user or their interests. The characteristics of the avatar and self-expression items chosen by the instant messaging user may be used to glean user characteristics or other types of information that describe the user in some way, such as the user's geographical location, occupation, and various hobbies and interests.

16 Claims, 15 Drawing Sheets

U.S. PATENT DOCUMENTS

| | | |
|---|---|---|
| 6,374,237 B1 | 4/2002 | Reese |
| 6,466,213 B2 | 10/2002 | Bickmore et al. |
| 6,539,375 B2 | 3/2003 | Kawasaki |
| 6,545,682 B1 | 4/2003 | Ventrella et al. |
| 6,560,588 B1 | 5/2003 | Minter |
| 6,587,127 B1 | 7/2003 | Leeke et al. |
| 6,640,229 B1 | 10/2003 | Gilmour et al. |
| 6,654,735 B1 | 11/2003 | Eichstaedt et al. |
| 6,694,375 B1 | 2/2004 | Beddus et al. |
| 6,708,203 B1 | 3/2004 | Makar et al. |
| 6,708,205 B2 | 3/2004 | Sheldon et al. |
| 6,725,048 B2 | 4/2004 | Mao et al. |
| 6,748,326 B1 | 6/2004 | Noma et al. |
| 6,748,626 B2 | 6/2004 | Maurer |
| 6,772,195 B1 | 8/2004 | Hatlelid et al. |
| 6,910,186 B2 | 6/2005 | Kim |
| 6,948,131 B1 | 9/2005 | Neven et al. |
| 7,007,065 B2 | 2/2006 | Matsuda |
| 7,133,900 B1 | 11/2006 | Szeto |
| 7,177,811 B1 | 2/2007 | Ostermann et al. |
| 7,181,690 B1 | 2/2007 | Leahy et al. |
| 7,231,205 B2 | 6/2007 | Guyot et al. |
| 2002/0104087 A1 | 8/2002 | Schaffer et al. |
| 2002/0111994 A1 | 8/2002 | Raghunandan |
| 2002/0128746 A1 | 9/2002 | Boies et al. |
| 2003/0014274 A1 | 1/2003 | Chalon |
| 2003/0020749 A1 | 1/2003 | Abu-Hakima et al. |
| 2003/0050115 A1 | 3/2003 | Leen et al. |
| 2003/0061239 A1 | 3/2003 | Yoon |
| 2003/0074409 A1 | 4/2003 | Bentley |
| 2003/0156134 A1 | 8/2003 | Kim |
| 2003/0179222 A1 | 9/2003 | Noma et al. |
| 2003/0231207 A1 | 12/2003 | Huang |
| 2003/0236770 A1 | 12/2003 | Kurapati et al. |
| 2004/0034799 A1 | 2/2004 | Mikami |
| 2004/0215731 A1 | 10/2004 | Tzann-en Szeto |
| 2004/0221224 A1* | 11/2004 | Blattner et al. ........... 715/500.1 |
| 2006/0064645 A1 | 3/2006 | Neven et al. |
| 2006/0143569 A1 | 6/2006 | Kinsella et al. |

FOREIGN PATENT DOCUMENTS

| | | |
|---|---|---|
| WO | WO 01/84461 | 11/2001 |

OTHER PUBLICATIONS

The Wall Street Journal article "Esniff Ferrets Out Misbehavior By 'Reading' E-Mail, Web Visits," Katherine Lange, interactive.wsj.com, Apr. 27, 2001:Tech Q&A.

The Early Report-The Early Show segment, "Big Brother In The Corner Office," Julie Chen, cbsnews.com/earlyshow/caught/techage/20001228e_sniff.shtml, Dec. 28, 2000:Tech Age.

"The eSniff Product Overview," eSniff: Define Your e-Boundaries, www.esniff.com/product_overview.html, May 15, 2001.

InterCom Cartoon Chat System; http://www.nfx.com; 11 pages (Dec. 1, 2003).

Kerlow, Issac V.; *The Art of 3D Computer Animation and Effects, 3rd Edition*; John Wiley & Sons, Inc.; pp. 122, 358, 359 (2004).

Kurlander, et al; "Comic Chat"; *Proceedings of the 23rd Annual Conference on Computer Graphics and Interactive Techniques*; ACM Press, New York, NY; pp. 225-236 (1996).

"People Putty" *http://www.haptek.com/products/peopleputty*; 5 pages (Dec. 30, 2003).

Viewpoint: Viewpoint Experience Technology Getting Started; Version 1.1; pp. 1-21; (Jun. 19, 2002).

Viewpoint: Viewpoint Technology Feature Overview; Version 2.0; pp. 1-23; (Jun. 19, 2002).

* cited by examiner

USING AN AVATAR TO GENERATE USER PROFILE INFORMATION

TECHNICAL FIELD

This description relates to graphical representations of a communications application operator (hereinafter "sender") in communications sent in a network of computers.

BACKGROUND

Online services may provide users with the ability to send and receive instant messages. Instant messages are private online conversations between two or more people who have access to an instant messaging service, who have installed communications software necessary to access and use the instant messaging service, and who each generally have access to information reflecting the online status of other users.

An instant message sender may send self-expression items to an instant message recipient. Current implementations of instant messaging self-expression enable a user to individually select self-expression settings, such as an avatar capable of being animated, an unanimated icon, and a wallpaper, which settings thereafter project to other users who see or interact with that person online.

SUMMARY

In one general aspect, user profile information is generated by accessing an avatar selected by a user for use in a communication system. A user characteristic is determined based on the selected avatar, and the determined user characteristic is associated with user profile information that is associated with the user identity.

Implementations may include one or more of the following features. For example, the avatar may be selected by the user to represent the user in communications with another user of the communication system. The user profile information may be accessible to one or more users of the communication system. The user profile information may be accessed to direct advertisements to the user or may be accessed only to direct advertisements to the user. Detecting a user attribute may include detecting an attribute of the avatar and determining that the detected avatar attribute should inform an attribute of the user.

Associating the determined user characteristic may include adding to a list of items that constitute the user profile. Associating the determined user characteristic also may include displaying the determined user characteristic, receiving an indication from the user whether the determined user characteristic is to be associated with the user profile information associated with the user identity, and associating the determined user characteristic with user profile information associated with the user identity only after receiving an indication that the determined user characteristic is to be associated with the user profile information.

Determining a user characteristic based on the selected avatar may include determining a user characteristic based on attributes of the selected avatar itself or may include determining a user characteristic based on attributes of an object associated by the user with the selected avatar. An object associated by the user with the selected avatar may be distinct of the avatar itself. Determining a user characteristic from the selected avatar also may include determining a user characteristic based on attributes of an object to be displayed on the avatar. An object to be displayed on the avatar may be distinct of the avatar itself. Determining a user characteristic from the selected avatar also may include determining a user characteristic based on attributes of an object to be displayed near the avatar, determining a user characteristic based on a trigger associated with the avatar, or determining a user characteristic based on attributes of a wallpaper to be associated with the avatar.

Associating the determined user characteristic may include associating the determined user characteristic with an interest previously included in the user profile information, associating the determined user characteristic with an occupation included in the user profile information, or associating the determined user characteristic with an geographic location included in the user profile information.

The avatar may be capable of displaying multiple animations. The avatar also may be capable of being animated based on a trigger related to content of a message sent between the selecting user and another user. The communication system may include an instant messaging communication system.

Implementations of the techniques discussed above may include a method or process, a system or apparatus, or computer software on a computer-accessible medium. The details of one or more of the implementations are set forth in the accompanying drawings and description below. Other features will be apparent from the description and drawings, and from the claims.

DESCRIPTION OF DRAWINGS

Like reference symbols in the various drawings indicate like elements.

DETAILED DESCRIPTION

An instant messaging user may be represented in communications with other users by an avatar that is capable of being animated or may convey information about the user by displaying other types of self-expression items, such as non-animated icons, sounds, wallpaper, or objects associated with an avatar or wallpaper. In such a case, the avatar and self-expression items may have characteristics that relate to information that corresponds to or represents the user or their interests. The characteristics of the avatar and self-expression items chosen by the instant messaging user may be used to glean user characteristics or other types of information that describe the user in some way, such as the user's geographical location, occupation, and various hobbies and interests. This information may be referred to as "user characteristics" and may be used to create or update a user profile for the instant messaging user based on information corresponding to the user. As such, user characteristics do not include information used to operate the instant messaging system with respect to the user, such as an avatar identifier to identify an avatar that is associated with the user, a user name or other type of account identifier.

For example, a user may be represented by an avatar that portrays an image of a theatre mask, which may indicate that the user enjoys theatre or has an occupation related to the theatre (e.g., the user may be an actor). The user profile may be updated (perhaps, after confirmation by the user) to reflect the user's interest in theatre and/or occupation of actor, respectively.

Figure 1:
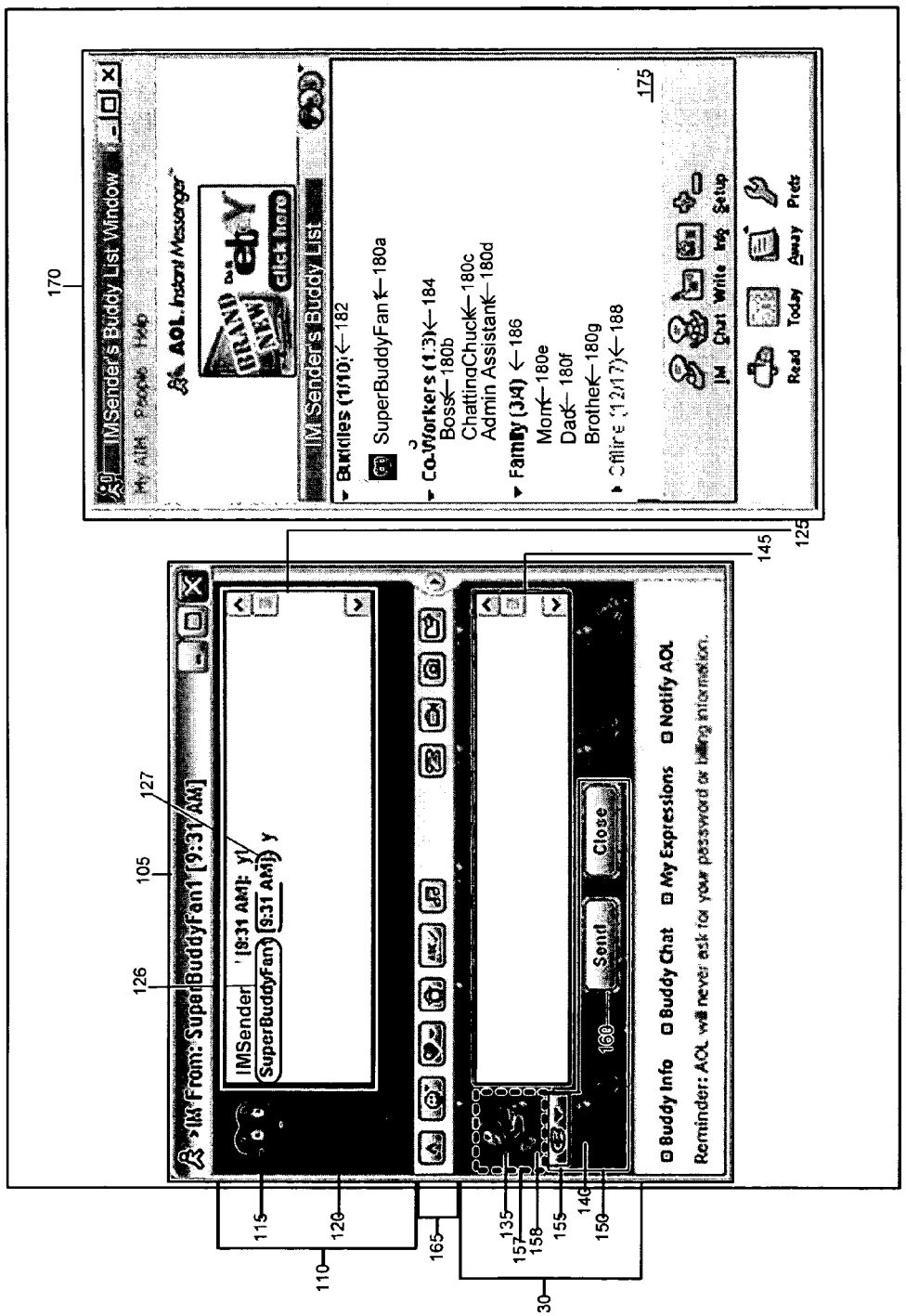
FIGS. 1-3C are illustrations of exemplary graphical user interfaces for an instant messaging service capable of enabling a user to project an avatar for self-expression.

FIG. 1 illustrates an exemplary graphical user interface 100 for an instant messaging service capable of enabling a user to project an avatar for self-expression. The user interface 100 may be viewed by a user who is an instant message sender and whose instant messaging communications program is configured to project an avatar associated with and used as an identifier for the user to one or more other users or user groups (collectively, instant message recipients). In particular, the user IMSender is an instant message sender using the user interface 100. The instant message sender projects a sender avatar 135 in an instant messaging communications session with an instant message recipient SuperBuddyFan1, who projects a recipient avatar 115. A corresponding graphical user interface (not shown) is used by the instant message recipient SuperBuddyFan1. In this manner, the sender avatar 135 is visible in each of the sender's user interface and the recipient's user interface, as is the recipient avatar 115. Both the sender and recipient avatars, 135 and 115, respectively, have been selected by the respective instant messaging users from a subset of avatars presented based on characteristics in a user profile associated with the instant messaging user, as described more fully later. The instant messaging communications session may be conducted simultaneously, near-simultaneously, or serially.

The user interface (UI) 100 includes an instant message user interface 105 and an instant messaging buddy list window 170.

The instant message user interface 105 has an instant message recipient portion 110 and an instant message sender portion 130. The instant message recipient portion 110 displays the recipient avatar 115 chosen by the instant message recipient with whom the instant message sender is having an instant message conversation. Similarly, the instant message sender portion 130 displays the sender avatar 135 chosen by the instant message sender. The display of the sender avatar 135 in the instant message user interface 105 enables the instant message sender to perceive the avatar being projected to the particular instant message recipient with whom the instant message sender is communicating. The avatars 135 and 115 are personalization items selectable by an instant message user for self-expression.

The instant message user interface 105 includes an instant message composition area 145 for composing instant message messages to be sent to the instant message recipient, and a message history text box 125 for displaying a transcript of the instant message communications session with the instant message recipient. Each of the messages sent to, or received from, the instant message recipient are listed in chronological order in the message history text box 125, each with an indication of the user that sent the message, as shown at 126. The message history text box 125 optionally may include a time stamp 127 for each of the messages sent.

Wallpaper may be applied to portions of the graphical user interface 100. For example, wallpaper may be applied to window portion 120 that is outside of the message history box 125 or window portion 140 that is outside of the message composition area 145. The recipient avatar 115 is displayed over, or in place of, the wallpaper applied to the window portion 120, and the wallpaper applied to the window portion 120 corresponds to the recipient avatar 115. Likewise, the sender avatar 135 is displayed over, or in place of, the wallpaper applied to the window portion 140 and the wallpaper applied to the window portion 120 corresponds to the sender avatar 135. In some implementations, a box or other type of boundary may be displayed around the avatar, as shown by boundary 157 displayed around the sender avatar 135. A wallpaper applied to window portion 158 inside the boundary 157 may differ from than the wallpaper applied to the window portion 140 outside of the message composition area 145 but not within the boundary 157. The wallpaper may appear to be non-uniform and may include objects that are animated. The wallpapers applied to the window portions 120 and 140 may be personalization items selectable by either or both of the sender and recipient instant message user for self-expression. The wallpapers applied to the window portions 120 and 140 have been selected by the instant messaging user from a list of available wallpapers because the selected wallpaper has one or more characteristics related to, or otherwise similar to information corresponding to the user.

The instant message user interface 105 also includes a set of feature controls 165 and a set of transmission controls 150. The feature controls 165 may control features such as encryption, conversation logging, conversation forwarding to a different communications mode, font size and color control, and spell checking, among others. The set of transmission controls 150 includes a control 160 to trigger sending of the message that was typed into the instant message composition area 145, and a control 155 for modifying the appearance or behavior of the sender avatar 135.

The instant message buddy list window 170 includes an instant message sender-selected list 175 of potential instant messaging recipients ("buddies") 180a-180g. Buddies typically are contacts who are known to the potential instant message sender (here, IMSender). In the list 175, the representations 180a-180g include text identifying the screen names of the buddies included in list 175; however, additional or alternative information may be used to represent one or more of the buddies, such as an avatar associated with the buddy, that is reduced in size and either still or animated. For example, the representation 180a includes the screen name and avatar of the instant message recipient named SuperBuddyFan1. The representations 180a-180g may visually indicate or enable access to connectivity information about the buddy, such as whether the buddy is online, how long the buddy has been online, whether the buddy is away, or whether the buddy is using a mobile device.

Buddies may be grouped by an instant message sender into one or more user-defined or pre-selected groupings ("groups"). As shown, the instant message buddy list window 170 has three groups, Buddies 182, Co-Workers 184, and Family 186. SuperBuddyFan1 185a belongs to the Buddies group 182, and ChattingChuck 185c belongs to the Co-Workers group 184. When a buddy's instant message client program is able to receive communications, the representation of the buddy in the buddy list is displayed under the name or representation of the buddy group to which the buddy belongs. As shown, at least potential instant messaging recipients 180a-180g are online. In contrast, when a buddy's instant message client program is not able to receive communications, the representation of the buddy in the buddy list may not be displayed under the group with which it is associated, as it may be instead displayed with representations of buddies from other groups under the heading Offline 188. All buddies included in the list 175 are displayed either under one of the groups 182, 184, or 186, or under the heading Offline 188.

As illustrated in FIG. 1, each of the sender avatar 135 and the recipient avatar 115 is a graphical image that represents a user in an instant message communications session and is selected by the user from a list of available avatars that may be of interest to the user because they are related, or otherwise similar to information corresponding to the user. The sender projects the sender avatar 135 for self-expression, whereas the recipient projects the recipient avatar 115 also for self-expression. Here, each of the animation avatars 135 or 115 is an avatar that only includes a graphical image of a face, which may be referred to as a facial avatar or a head avatar. In other implementations, an avatar may include additional body components. By way of example, a Thanksgiving turkey avatar may include an image of a whole turkey, including a head, a neck, a body and feathers.

The sender avatar 135 may be animated in response to an instant message sent to the instant message recipient, and the recipient avatar 115 may be animated in response to an instant message sent by the instant message recipient. For example, the text of an instant message sent by the sender may trigger an animation of the sender avatar 135, and the text of an instant message sent by the instant message recipient to the sender may trigger an animation of the recipient avatar 115.

More particularly, the text of a message to be sent is specified by the sender in the message specification text box 145. The text entered in the message specification text box 145 is sent to the recipient when the sender activates the send button 160. When the send button 160 is activated, the instant message application searches the text of the message for animation triggers. When an animation trigger is identified, the sender avatar 135 is animated with an animation that is associated with the identified trigger. This process is described more fully later. In a similar manner, the text of a message sent by the instant message recipient and received by the sender is searched for animation triggers and, when found, the recipient avatar 115 is animated with an animation associated with the identified trigger. By way of example, the text of a message may include a character string "LOL," which is an acronym that stands for "laughing out loud." The character string "LOL" may trigger an animation in the sender avatar 135 or the recipient avatar 115 such that the sender avatar 135 or the recipient avatar 115 appears to be laughing.

Alternatively or additionally, the sender avatar 135 may be animated in response to an instant message sent from the instant message recipient, and the recipient avatar 115 may be animated in response to a message sent from the instant message sender. For example, the text of an instant message sent by the sender may trigger an animation of the recipient avatar 115, and the text of an instant messages sent by the instant message recipient to the sender may trigger an animation of the sender avatar 135.

More particularly, the text of a message to be sent is specified by the sender in the message specification text box 145. The text entered in the message specification text box 145 is sent to the recipient when the sender activates the send button 160. When the send button 160 is activated, the instant message application searches the text of the message for animation triggers. When an animation trigger is identified, the recipient avatar 115 is animated with an animation that is associated with the identified trigger. In a similar manner, the text of a message sent by the instant message recipient and received by the sender is searched for animation triggers and, when found, the sender avatar 135 is animated with an animation associated with the identified trigger.

In addition, the sender avatar 135 or the recipient avatar 115 may be animated in direct response to a request from the sender or the recipient. Direct animation of the sender avatar 135 or the recipient avatar 115 enables use of the avatars as a means for communicating information between the sender and the recipient without an accompanying instant message. For example, the sender may perform an action that directly causes the sender avatar 135 to be animated, or the recipient may perform an action that directly causes the recipient avatar 115 to be animated. The action may include pressing a button corresponding to the animation to be played or selecting the animation to be played from a list of animations. For example, the sender may be presented with a button that inspires an animation in the sender avatar 135 and that is distinct from the send button 160. Selecting the button may cause an animation of the sender avatar 135 to be played without performing any other actions, such as sending an instant message specified in the message composition area 145. The played animation may be chosen at random from the possible animations of the sender avatar 135, or the played animation may be chosen before the button is selected.

An animation in one of the avatars 135 or 115 displayed on the instant messaging user interface 105 may cause an animation in the other avatar. For example, an animation of the recipient avatar 115 may trigger an animation in the sender avatar 135, and vice versa. By way of example, the sender avatar 135 may be animated to appear to be crying. In response to the animation of the sender avatar 135, the recipient avatar 115 also may be animated to appear to be crying. Alternatively, the recipient avatar 115 may be animated to appear comforting or sympathetic in response to the crying animation of the sender avatar 135. In another example, a sender avatar 135 may be animated to show a kiss and, in response, a recipient avatar 115 may be animated to blush.

The recipient avatar 115 may appear to respond to a perceived mood of the sender communicated by the sender avatar 135. By way of example, in response to a frowning or teary animation of the sender avatar 135, the recipient avatar 115 also may appear sad. Alternatively, the recipient avatar 115 may be animated to try to cheer up the sender avatar 135, such as by smiling, exhibiting a comical expression, such as sticking its tongue out, or exhibiting a sympathetic expression.

An avatar 135 or 115 may be animated in response to a detected idle period of a predetermined duration. For example, after a period of sender inactivity, the sender avatar 135 may be animated to give the appearance that the avatar is sleeping, falling off of the instant messaging interface 105, or some other activity indicative of inactivity. An avatar 135 or 115 also may progress through a series of animations during a period of sender inactivity. The series of animations may repeat continuously or play only once in response to the detection of an idle period. In one example, the sender avatar 135 may be animated to give the appearance that the avatar is sleeping and then having the avatar appear to fall off the instant messaging user interface 105 after a period of sleeping. Animating an avatar 135 or 115 through a progression of multiple animations representative of a period of sender inactivity may provide entertainment to the sender. This may lead to increased usage of the instant messaging user interface 105 by the sender, which in turn, may lead to an increased market share for the instant message service provider.

The sender avatar 135 or the recipient avatar 115 may be animated to reflect the weather at the geographic locations of the sender and the recipient, respectively. For example, if rain is falling at the geographic location of the sender, then the sender avatar 135 may be animated to put on a raincoat or open an umbrella. The wallpaper corresponding to the sender avatar 135 also may include raindrops animated to appear to be failing on the sender avatar 135. The animation of the sender avatar 135 or the recipient avatar 115 played in response to the weather may be triggered by weather information received on the sender's computer or the recipient's computer, respectively. For example, the weather information may be pushed to the sender's computer by a host system of an instant messaging system being used. If the pushed weather information indicates that it is raining, then an animation of the sender avatar 135 corresponding to rainy weather is played.

Furthermore, the avatar may be used to audibly verbalize content other than the text communicated between parties during a communications session. For example, if the text "Hi" appears within a message sent by the sender, the sender avatar 135 may be animated to verbally say "Hello" in response. As another example, when the text "otp" or the text "on the phone" appears within a message sent by the recipient, the recipient avatar 115 may be animated to verbally say "be with you in just a minute" in response. As another example, in response to an idle state, an avatar may audibly try to get the attention of the sender or the recipient. For example, when the recipient sends a message to the sender that includes a question mark and the sender is determined to be idle, the recipient avatar 115 may audibly say "Hello? You there?" to try to elicit a response from the sender regarding the recipient's question.

The sender may mute the recipient avatar 115 or the sender avatar 135 to prevent the recipient avatar 115 or the sender avatar 135 from speaking further. By way of example, the sender may prefer to mute the recipient avatar 115 to prevent the recipient avatar 115 from speaking. In one implementation, to show that an avatar is muted, the avatar may appear to be wearing a gag.

The voice of an avatar may correspond to the voice of a user associated with the avatar. To do so, the characteristics of the user's voice may be extracted from audio samples of the user's voice. The extracted characteristics and the audio samples may be used to create the voice of the avatar. Additionally or alternatively, the voice of the avatar need not correspond to the voice of the user and may be any generated or recorded voice.

The sender avatar 135 may be used to communicate an aspect of the setting or the environment of the sender. By way of example, the animation and appearance of the sender avatar 135 may reflect aspects of the time, date or place of the sender or aspects of the circumstances, objects or conditions of the sender. For example, when the sender uses the instant messaging user interface 105 at night, the sender avatar 135 may appear to be dressed in pajamas and have a light turned on to illuminate an otherwise dark portion of the screen on which the avatar is displayed and/or the sender avatar 135 may periodically appear to yawn. When the sender uses the instant messaging user interface 105 during a holiday period, the sender avatar 135 may be dressed in a manner illustrative of the holiday, such as appearing, as Santa Claus during December, a pumpkin near Halloween, or Uncle Sam during early July. The appearance of the sender avatar 135 also may reflect the climate or geographic location of the sender. For example, when rain is falling in the location of the sender, wallpaper corresponding the sender avatar 135 may include falling raindrops and/or the sender avatar 135 may wear a rain hat or appear under an open umbrella. In another example, when the sender is sending instant message from a tropical location, the sender avatar 135 may appear in beach attire.

The sender avatar 135 also may communicate an activity being performed by the sender while the sender is using the instant messaging user interface 105. For example, when the sender is listening to music, the avatar 135 may appear to be wearing headphones. When the sender is working, the sender avatar 135 may be dressed in business attire, such as appearing in a suit and a tie. Activity may be gleaned through monitoring of resources associated with the user (e.g., the computer itself may reveal streaming of music, and the computer Internet protocol ("IP") connection may reveal work location), or based upon user-designated defaults (e.g., work assumed between 9 AM and 5 PM).

The appearance of the sender avatar 135 also may communicate the mood or an emotional state of the sender. For example, the sender avatar 135 may communicate a sad state of the sender by frowning or shedding a tear. The appearance of the sender avatar 135 or the recipient avatar 115 may resemble the sender or the recipient, respectively. For example, the appearance of the sender avatar 135 may be such that the sender avatar 135 appears to be of a similar age as the sender. In one implementation, as the sender ages, the sender avatar 135 also may appear to age. As another example, the appearance of the recipient avatar 115 may be such that the recipient avatar 115 has an appearance similar to that of the recipient.

In some implementations, the wallpaper applied to the window portion 120 and/or the wallpaper applied to the window portion 140 may include one or more animated objects. These objects may be included with the avatar and/or wallpaper selected by the user, or may be selectable by the user or triggered separate from the selection or triggering of the avatar or wallpapers. One or more objects may be selected by the user from a list of available objects, where the objects in have one or more characteristics related to, or otherwise similar to, information corresponding to the instant messaging user.

The animated objects may repeat continuously or periodically on a predetermined or random basis a series of animations. Additionally or alternatively, the wallpapers applied to the window portions 120 and 140 may be animated to in response to the text of messages sent between the sender and the recipient. For example, the text of an instant message sent by the sender may trigger an animation of the animated objects included in the wallpaper corresponding to the sender avatar 135, and the text of an instant messages sent by the instant message recipient to the sender may trigger an animation of the animated objects included in the wallpaper corresponding to the recipient avatar 115. The animated objects included in the wallpapers may be animated to reflect the setting or environment, activity and mood of the recipient and the sender, respectively.

An avatar may be used as a mechanism to enable self-expression or additional non-text communication by a user associated with the avatar. For example, the sender avatar 135 is a projection of the sender, and the recipient avatar 115 is a projection of the recipient. The avatar represents the user in instant messaging communications sessions that involve the user. The personality or emotional state of a sender may be projected or otherwise communicated through the personality of the avatar. Some users may prefer to use an avatar that more accurately represents the user. As such, a user may change the appearance and behavior of an avatar to more accurately reflect the personality of the user. In some cases, a sender may prefer to use an avatar for self-expression rather than projecting an actual image of the sender. For example, some people may prefer using an avatar to sending a video or photograph of the sender. In either case, information about the user may be gleaned from the user's avatar. This information may be used to identify information corresponding to the user, such as the user's geographical location, occupation, and various interests of the user, and update the user's profile to reflect this information.

Figure 2:
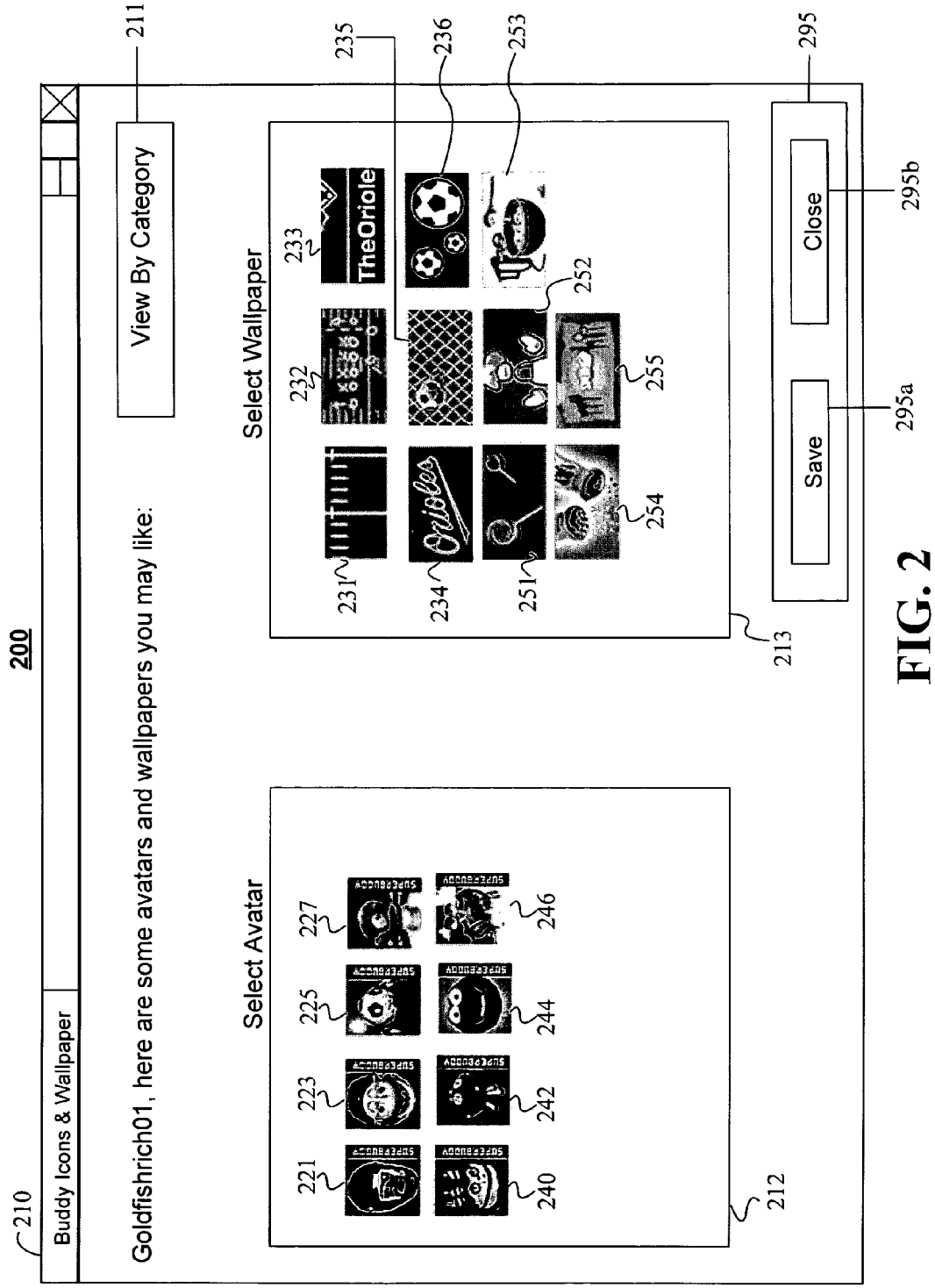

FIG. 2 shows an exemplary user interface 210 for selecting an avatar and wallpaper from a subset of available avatars and wallpaper based on information that corresponds to the user. The user interface 210 includes an avatar selection window 212 that displays a subset of available avatars that correspond to user profile information.

In this example, the user profile of the user "Goldfishrich01" includes a geographical location of Baltimore, Md., an interest in football, and an occupation of chef. Based on the user profile information, the instant messaging service identifies and presents, in the avatar selection window 212, a subset of avatars that have attributes related to Baltimore, Md., football, sports, chef, cooking, restaurants, and food. In particular, the avatar selection window 212 displays a Baltimore Ravens avatar 221 (related to Baltimore, Md., and football), a baseball avatar 223 (related to sports), a soccer avatar 225 (related to sports), a boxing avatar 227 (related to sports), a birthday cake avatar 240 (related to food), a grill avatar 242 (related to chef, cooking, and food), a meatball avatar 244 (related to food), and a crab avatar 246 (related to Maryland, Baltimore, Md. and food).

The user interface 210 also includes a wallpaper selection window 213 that displays a subset of available wallpapers that correspond to the user profile information for the user "Goldfishrich01." Similarly to the identification and presentation of a subset of avatars, the instant messaging service identifies and presents, in the wallpaper selection window 213, a subset of wallpapers based on user profile information. In particular, in keeping with the above example, the wallpaper selection window 213 displays football field wallpaper 231 (related to football and sports), football game plan wallpaper 232 (related to football and sports), Baltimore Orioles wallpapers 233 and 234 (related to Baltimore, Md., and sports), soccer net wallpaper 235 (related to sports), soccer ball wallpaper 236 (related to sports), lollipop wallpaper 251 (related to food), chef wallpaper 252 (related to chef, cooking, restaurants, and food), mixing bowl wallpaper 253 (related to chef, cooking, and food), salt and pepper wallpaper 254 (related to cooking, restaurants, and food), and table setting wallpaper 255 (related to restaurants and food).

The presentation order of the avatars in the avatar selection window 212 may be based on how closely the avatars match the user profile information. For example, the Baltimore Raven avatar 221 may be presented first because the user profile information includes "Baltimore Ravens" as an interest, whereas the baseball avatar 223, the soccer ball avatar 225, and the boxing avatar 227 may be presented after the Baltimore Raven avatar 221 due to the more indirect relationship of the avatars 223, 225 and 227 representing sports that is derived from the user's interest in the "Baltimore Ravens."

Alternatively or additionally, the instant messaging service may identify and present a subset of wallpapers 231-255 in the wallpaper selection window 213 based on the subset of avatars identified and presented in the avatar selection window 212. For example, the football field wallpaper 231 and the football game plan wallpaper 232 may be identified and presented based on the Baltimore Ravens avatar 221 in the avatar selection window 212. In some implementations, the selection by a user of a particular avatar in the avatar selection window 221 may affect the presentation order, or whether a wallpaper is presented, in the wallpaper selection window 213. For example, when a user selects the soccer ball avatar 225, the order of the wallpapers 231-255 may be re-arranged so that the soccer net wallpaper 235 and the soccer ball wallpaper 236 are presented first (e.g., in the position of wallpapers 231 and 232 in the wallpaper selection window 213). In some implementations, the user interface 210 may also include a self-expression item selection window (not shown) for other types of self-expression items, such as a non-animated icon, in addition to, or in lieu of, one or both of the avatar selection window 212 or the wallpaper selection window 213. The instant messaging service may identify and present items in the self-expression item selection window based on user profile information for selection by the user. Additionally or alternatively, the presented self-expression items may be identified based on an association with a particular avatar or wallpaper that was previously selected by the user.

The user interface 210 also includes a control window 295 having a save control 295A that is operable to associate the avatar, for example, Baltimore Ravens avatar 221, selected in the avatar window 212 with the user. The activation of the save control 295a also may initiate the execution of a process to determine user profile information based on the avatar selected by the user. The control window 295 also includes a close control 295b that a user may activate to end the avatar and wallpaper selection process and close the display of the user interface 210.

The user interface 210 also includes a view-by-category control 211 that enables a user to view avatars, wallpaper, and/or other types of self-expression items by pre-determined categories that are not necessarily related to user profile information associated with the user. The ability to view self-expression items by category may be useful, for example, when an instant messaging user wishes to view and/or select an avatar, wallpaper, or another type of self-expression item that is not related to information present in the user profile and are not presented in the avatar selection window 212.

Figure 3A:
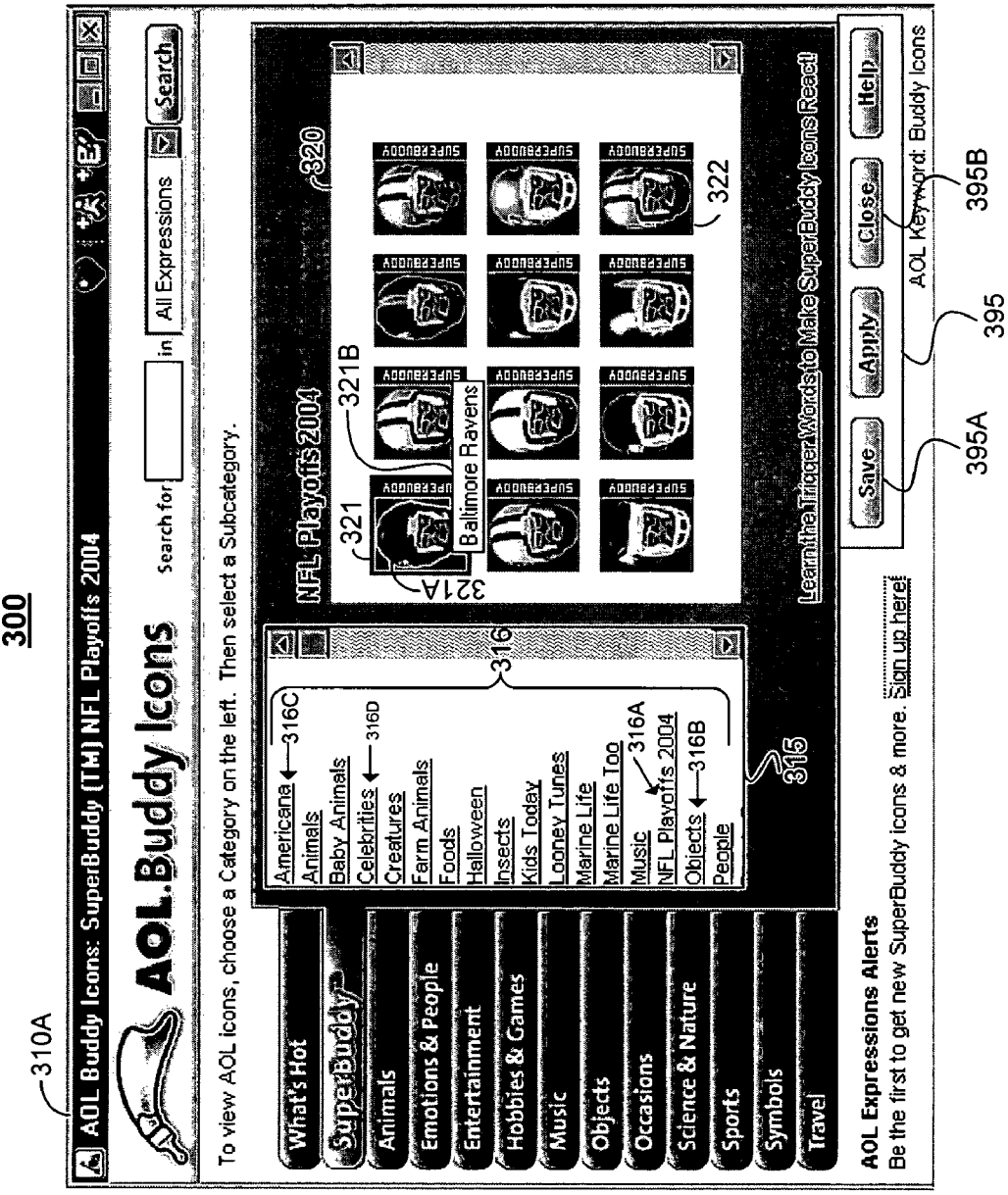
Figure 3B:
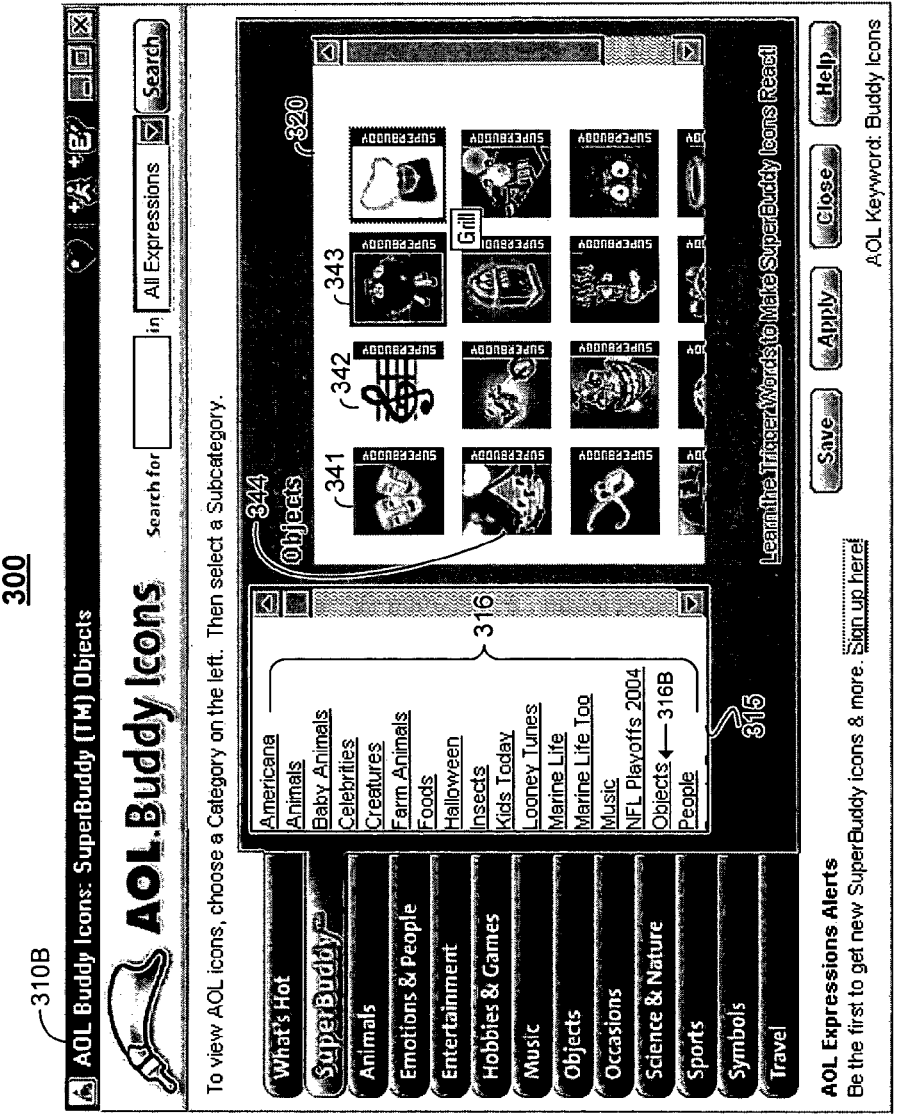
Figure 3C:
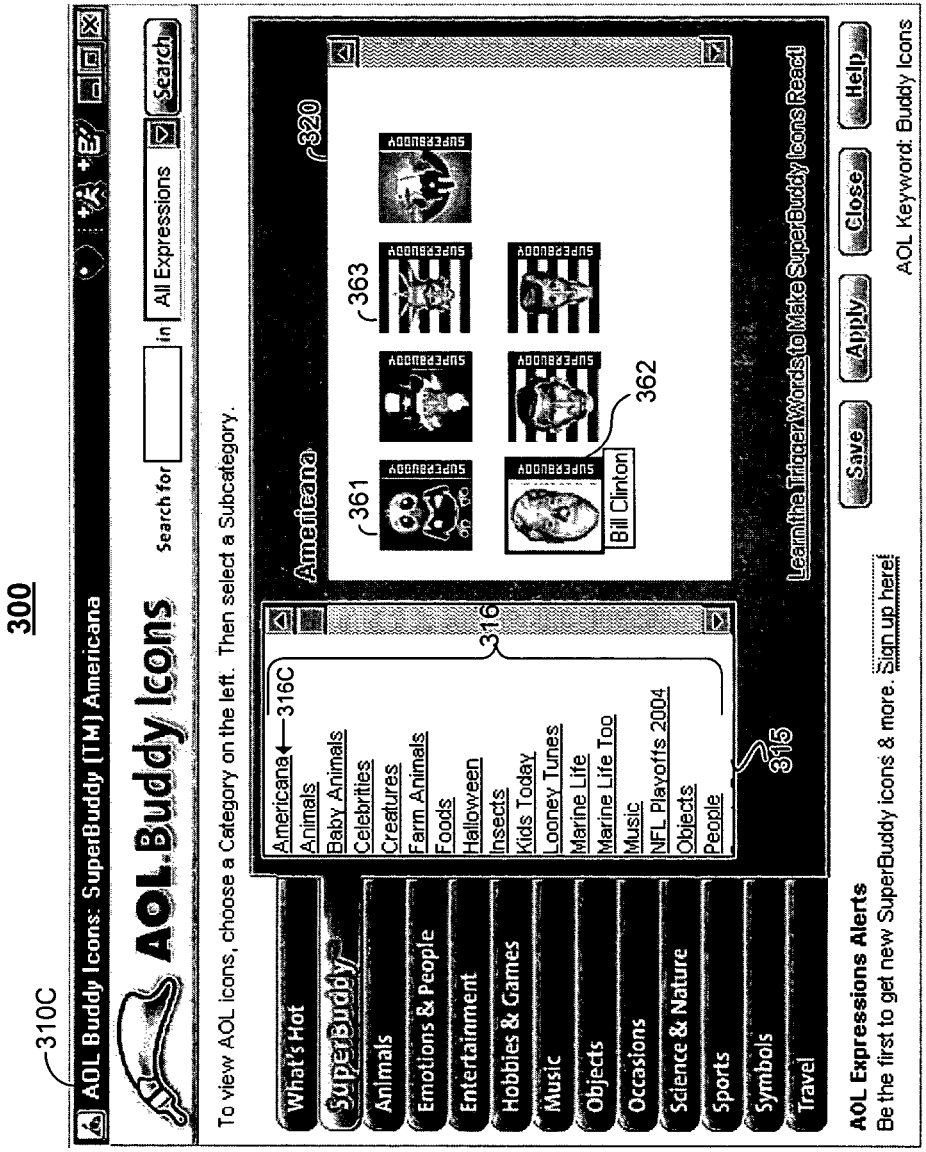

FIGS. 3A-3C show exemplary graphical user interfaces where the avatars presented to the user for selection are displayed by category. Once selected, avatars may be used to update a user profile associated with the user, as described more fully later. FIG. 3A shows an exemplary user interface 310A for selecting an avatar and updating user profile information based on the user's selection of an avatar. The user interface 310A includes a category window 315 that displays a list 316 of categories where each category groups multiple avatars. For example, an avatar may be associated with a particular category because the avatar has a characteristic or feature that is similar to characteristics or features of other avatars. Examples of categories include an NFL Playoffs 2004 category having avatars for football teams involved in the NFL playoff games in 2004, an objects category 316B having avatars that represent various types of objects, an Americana category 316C having avatars that represent aspects of American life, and a celebrities category 316D having avatars representing celebrities.

A user may select a category from the category list 316, such as category 316A, 316B, 316C, or 316D. For example, a user may select a particular category by activating a button on a pointing device when the cursor controlled by the pointing device hovers over the position of the particular category on the display device presenting the user interface 310A.

The user interface 310A also includes an avatar window 320 that displays avatars belonging to the category selected in category list 316 of the category window 315. Each of the avatars in the avatar window 320 is associated with an appearance and a name. In one example, avatar 321 has an appearance 321A of a Baltimore Ravens football player and a name 321B of "Baltimore Ravens." The avatar window 320 displays the appearance of each avatar and is operable to display a name associated with a particular avatar when a cursor associated with a pointing device hovers over the position of the appearance of the particular avatar. As illustrated in FIG. 3A, the name 321B of the avatar associated with the appearance 321A is displayed in response to the cursor hanging over avatar 321. In some implementations, the name of an avatar may be displayed along with the appearance of the avatar regardless of whether the cursor is hovering over the appearance.

As illustrated in avatar window 320, the avatars are displayed using a small representation (which may be referred to as a "thumbnail"). Additionally or alternatively, the avatar window 320 may display a list of avatar names from which the user selects or may only show one avatar associated with the selected category at a time.

The user interface enables a user to select an avatar displayed in the avatar window 322, as shown by a solid, dark box around the outside of the avatar 321.

In some implementations, when the user initiates the avatar selection process, the first category, here the Americana category 316C in the category list 316 may be selected by default and the avatars associated with the Americana category 316C may be shown in the avatar window 320. The first avatar displayed in the avatar window 320 may be selected by default. In other implementations, although the first category is selected by default, no avatar shown in avatar window 320 may be selected by default.

In some implementations, when the user initiates the avatar selection process, a particular category may be selected based on information gleaned from the user profile. For example, the particular category 316A of NFL Playoffs 2004 may be automatically selected in the category window 315 based on an interest of football identified in the user profile information. In some implementations, a particular avatar in the avatar window may also be automatically selected based on the user profile information. In one example, the avatar 321A may be selected based on an interest in the Baltimore Ravens in the user profile information. In another example, user profile information that includes an interest in football and a geographical location associated with the user of Baltimore, Md. also may result in the selection of the Baltimore Ravens avatar 321A. However, even when the category 316a is selected based on user profile information, a particular avatar within that category need not be automatically selected based on user profile information.

The user interface 310A also includes a control window 395 having a save control 395A that is operable to associate the avatar selected in the avatar window (here, avatar 321) with the user and initiate the execution of a process to determine user profile information based on the avatar selected by the user. The control window 395 also includes a close control 395B that a user may activate to end the avatar selection process and close the display of the user interface 310A.

FIG. 3B illustrates another example of a user interface 310B for selecting an avatar and updating user profile information based on the user's selection of an avatar. In contrast to FIG. 3A, the objects category 316B is selected in the category window 315 of the user interface 330 and the avatar window 320 includes avatars associated with the category 316B. The avatar window 320 includes a theatre mask avatar 341, a g-clef avatar 342, a barbeque grill avatar 343 and a house avatar 344.

FIG. 3C illustrates yet another example of a user interface 310C for selecting a avatar and updating user profile information based on the user's selection of an avatar. In contrast to FIGS. 3A and 3B, the Americana category 316C is selected in the category window 315 of the user interface 330 and the avatar window 320 includes avatars associated with the category 316C. The avatar window 320 includes an American eagle avatar 361, a Bill Clinton avatar 362 and a Statute of Liberty avatar 363.

Referring to FIGS. 3A-3C, the appearance of an avatar may represent, by way of example, living, fictional or historical people, sea creatures, amphibians, reptiles, mammals, birds, or animated objects. Some avatars may be represented only with a head, such as avatars 321 and 322 of FIG. 3A, and avatars 362 and 363 of FIG. 3C. In one example, the appearance of the avatar 363 includes the head of the statue of liberty. The appearance of an avatar also may include only a portion or a specific part of a head. For example, the appearance of the avatar may resemble a set of lips (not shown). Other avatars may be represented by a body in addition to a head. For example, the appearance of the avatar 361 includes a both the body and head of an American eagle. Avatars may also be represented by objects that may or may not also represent human characteristics. For example, in FIG. 3B, the avatar 343 has the appearance of a barbecue grill and avatar 344 has the appearance of a house, such that each take on the human characteristic of a face by incorporating facial features into existing portions of the object. In contrast, the avatar 341 has the appearance of a theatre mask, and the avatar 342 has the appearance of a g-clef, neither of which include the indication that these objects are taking on human characteristics.

An avatar may be displayed over wallpaper that is related in subject matter to the avatar. In one example, the Baltimore Ravens football player avatar 321 may be displayed over wallpaper that is indicative of a football field on which the avatar 321 plays.

One of multiple avatars may be chosen by a user of the instant messaging system. Each of the avatars is associated with an appearance, characteristics and behaviors that express a particular type of personality. For example, the avatar 342 of FIG. 3B, which has the appearance of a g-clef, may be chosen to show that the instant messaging user enjoys music.

Each of the avatars is a multi-dimensional character with depth of personality, voice, and visual attributes. In contrast to representing a single aspect of a user through the use of an unanimated, two-dimensional graphical icon, an avatar is capable of indicating a rich variety of information about the user projecting the avatar. Properties of the avatar enable the communication of physical attributes, emotional attributes, and other types of context information about the user that are not well-suited (or even available) for presentation through the use of two-dimensional icons that are not animated. In one example, the avatar may reflect the user's mood, emotions, and personality. In another example, the avatar may reflect the location, activities and other context of the user. These characteristics of the user may be communicated through the appearance, the visual animations, and the audible sounds of the avatar, all of which occur as the result of various words or symbols, that when typed into the instant messaging window act as a trigger to change the appearance, animation, and/or sounds of the avatar.

In one example of an avatar personality, an avatar 321 of FIG. 3A having the appearance of a Baltimore Ravens football player may be associated with an athletic, energetic, and maybe even aggressive personality. The Baltimore Ravens avatar's behaviors reflect events in football games. For example, the avatar's yell animation is an "hut, hut, hike" chant, his big-smile animation is "touchdown!," and, during a frown animation or a tongue-out animation, the avatar shows a yellow flag being thrown into the air. Using wallpaper, the Baltimore Ravens avatar is customizable to represent other aspects of a football player's life, such as a football field, end zone, or locker room. Special features of the Baltimore Ravens avatar include a helmet and face mask in the Baltimore Ravens colors of purple and yellow.

In another example, a American eagle avatar 361 of FIG. 3C may be selected by a user who is interested in politics. In response to a "smile" or ":)" trigger, the American eagle avatar may bounce toward the foreground of the IM window and yells "Vote Today!" During a frown animation or a tongue-out animation, the avatar may be placed behind a sign that says "closed" and the American eagle avatar may be shown as visibly upset. The American eagle avatar may respond to a "vote" trigger by doing a somersault in the air and suddenly appearing in front of a large check mark while brimming with excitement. Using wallpaper, the American eagle avatar may be customized to represent a political party favored by a user.

In another example, a silent movie avatar (not shown) is reminiscent of silent film actor in the 1920's and 1930's. A silent movie avatar is depicted using a stove-pipe hat and a handle-bar moustache. The silent movie avatar is not associated with audio. Instead of speaking, the silent movie avatar is replaced by, or displays, placards having text in a manner similar to how speech was conveyed in a silent movie. Such an avatar may convey an interest in movies or the time period of the 1920's and 1930's.

In other examples, an avatar may be appropriate to pop culture, current events or a season. For example, seasonal avatars may include a Santa Claus avatar, a dreidel avatar, an Uncle Sam avatar, a Thanksgiving turkey avatar, a Jack-o-Lantern avatar, a Valentine's Day heart avatar, an Easter egg avatar, and an Easter bunny avatar.

Figure 4:
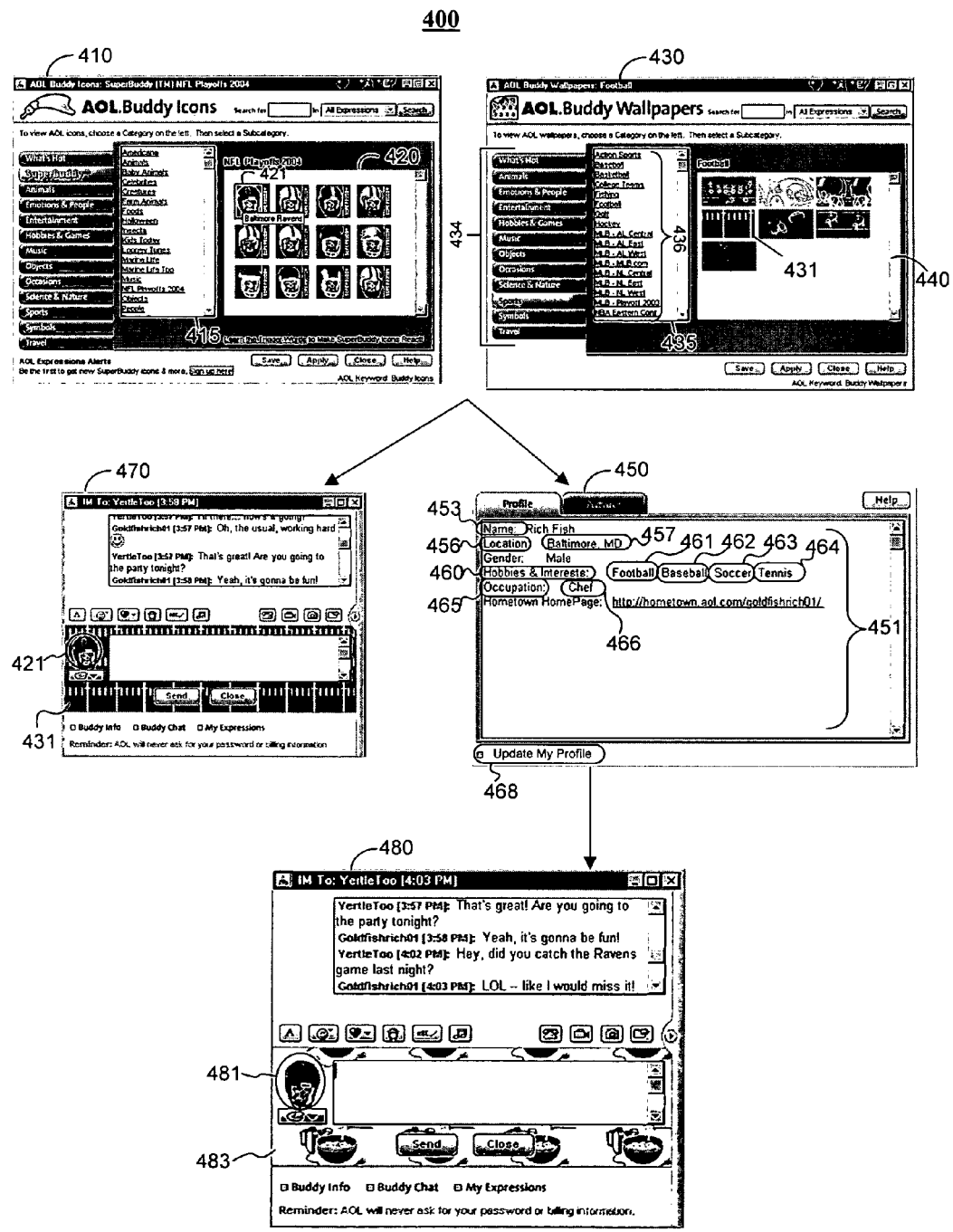
FIG. 4 shows a series of exemplary graphical user interfaces illustrating how a selection of an avatar by a user updates user profile information for the user.

FIG. 4 shows a series 400 of exemplary user interfaces illustrating a manner in which a user's selection of an avatar inspires or triggers an update to a user profile information for the user, which, in turn, inspires or triggers an update to the selection of wallpaper associated with the user. As shown, the user interface 410 enables a user to select an avatar, and the user interface 430 enables a user to select wallpaper. The avatar-selection user interface 410 includes an avatar window 420 that displays the avatars belonging to the category selected in category window 415. The wallpaper-selection user interface 430 includes a wallpaper window 440 that displays the wallpapers belonging to the category selected from category tab list 434, as well as the wallpaper sub-category selected in the wallpaper sub-category window 435.

As illustrated in the example of FIG. 4, the avatar 421 having the appearance of a Baltimore Ravens football player is selected in the avatar window 420, and the wallpaper 431 having the appearance of a football field is selected from wallpaper display window 440.

The instant messaging window 470 includes the selected avatar 421 and the selected football field wallpaper 431 based on the application of the user's selections in user interfaces 410 and 430, respectively.

The series 400 also includes user profile interface 450. The user profile window 450 displays user profile information that corresponds to the user. The user profile information may be viewable by only the user, by the user and other or designated instant messaging users, or may not be viewable by instant messaging user (including the user himself or herself). A user profile that is not viewable by an instant messaging user may be useful to direct particular content to the user, including avatar or other types of self-expressive items, advertisements or a directory of services.

User profile information in the user profile interface 450 may be created or updated based on information derived from the user's selection of a particular avatar, wallpaper, and other types of self-expression items. In the example of series 400, the user also may manually update the user profile information.

In particular, the user information window 451 lists user profile data types that includes the user's name 453, geographical location 456, hobbies and interests 460, and occupation 465. The values of the user profile data types that are displayed in the user information window 451 may be created or updated based on the information derived from the user's selected avatar and wallpaper, or may be created or updated manually by the input of information by the user.

As shown, the user profile interface 450 displaying user profile information for the user corresponding to the selected avatar 421 and selected wallpaper 431 indicates updated user profile information based on the selection of the avatar 421 in user interface 410 and the selection of wallpaper 431 in user interface 430. In particular, the instant messaging service detects the attributes of Baltimore, Md., Baltimore Ravens, football, and sports. The instant messaging service then determines to which user profile data types the detected attributes correspond. In particular, the instant messaging service recognizes that Baltimore, Md. as a geographical location, and that Baltimore Ravens, football, and sports are interests. The instant messaging service presents the proposed user profile information in the window 450 for confirmation by the user. As shown, the instant messaging service suggests updating Location 456 with Baltimore, Md. 457 and updating Hobbies & Interests 460 with football 461. When the user confirms that user profile information should be updated by selecting control 468, the instant messaging service updates the user profile information as shown in the user information window 451. In particular, as shown, the user information window 451 is updated with the user profile data that includes the Location 456 as Baltimore, Md. 457, Hobbies & Interests field 460 as football 461, baseball 462, soccer 463, and tennis 464, and Occupation 465 as Chef 466.

The user profile interface 450 also enables a user to enter additional user profile information which, in turn, may cause the selection process to identify a subset of available avatars, wallpaper, or other self-expression items based on the information that the user manually added to the user profile. The instant messaging system presents the subset of available wallpapers for selection by the user. In particular, the Occupation field 465 of the user profile information is set by the user to reflect the occupation of "chef" 466. From this information, the instant messaging service detects the attributes of chef, cooking, restaurants, and food. Based on the detected attributes, the instant messaging service identifies and presents wallpaper having attributes of chef, cooking, restaurants, or food for selection by the user. This may be accomplished, for example, by presenting the subset of wallpapers to the user for selection through user interface 430. For example, the user interface 430 may display a selection window showing the subset of wallpapers that includes a cooking wallpaper having the appearance of ingredients being mixed in a bowl by various kitchen utensils and appliances (not shown). The user may select one of the subset of wallpapers or chose to retain the wallpaper previously selected.

As shown in instant messaging window 480, the user selected to replace wallpaper 431 with wallpaper 483 having the appearance of ingredients being mixed in a bowl by various kitchen utensils and appliances. The instant messaging window 480 represents the user's geographical location of Baltimore, Md. and an interest in football (through the avatar 481), and the user's occupation as a chef (through the wallpaper 483).

Figure 5:
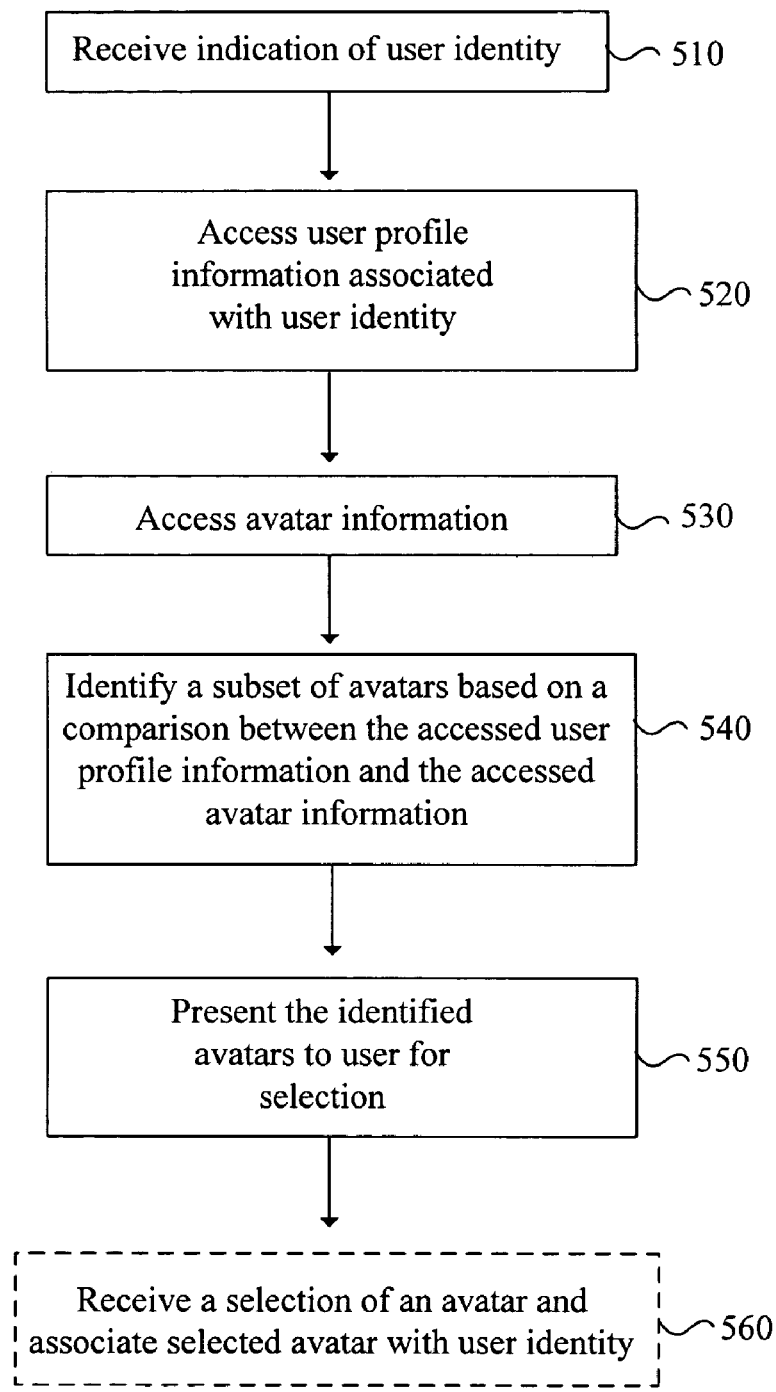
FIG. 5 is a flow chart of an exemplary process for identifying a subset of avatars based on user profile information.

FIG. 5 illustrates a process 500 for identifying a subset of avatars based on user profile information and enabling selection of one of the avatars by a user. The process 500 may be performed by a processor executing an instant messaging communications program. The process 500 may begin when a user indicates a desire to select an avatar, such as by initiating an avatar selection function provided by an instant messaging service.

The processor receives an indication of a user identity (step 510). The user identity may be associated with user who initiated the process 500, and, for example, may be a user identifier (such as a user account identifier or a screen name) entered when a user signs on to an instant message communications application. Continuing with the example discussed above with respect to FIG. 4, the processor receives an indication of the user identity "Goldfishrich01."

The processor accesses user profile information corresponding to the user identity (step 520). This may be accomplished, for example, by searching user profile information (which may be stored in a database table) for an entry that corresponds to the received user identity. In the example of "Goldfishrich01," the processor may access a user profile that identifies an occupation of chef and an interest in cooking, restaurants, and food.

The processor accesses avatar information for avatars available for selection (step 530) and identifies a subset of avatars based on a comparison between the accessed user profile information and the accessed avatar information (step 540). This may be accomplished, for example, by searching a list of avatars that includes attributes (or other types of descriptive information) for an attribute that corresponds to an entry in the user profile information. In example of "Goldfishrich01," the processor identifies avatars having an attribute corresponds to chef, cooking, restaurant, or food and includes the identified avatars in the subset of avatars.

The process presents the identified subset of avatars to the user for selection (step 550). If the user selects an avatar from the subset, the processor receives an indication of the user's selection and associates the selected avatar with the user identity (step 560). For example, if the user "Goldfishrich01" selects a chef avatar, the processor receives an indication of that selection, such as receiving an identifier that is uniquely associated with the avatar, and associates the chef avatar with the user identity "Goldfishrich01."

Figure 6:
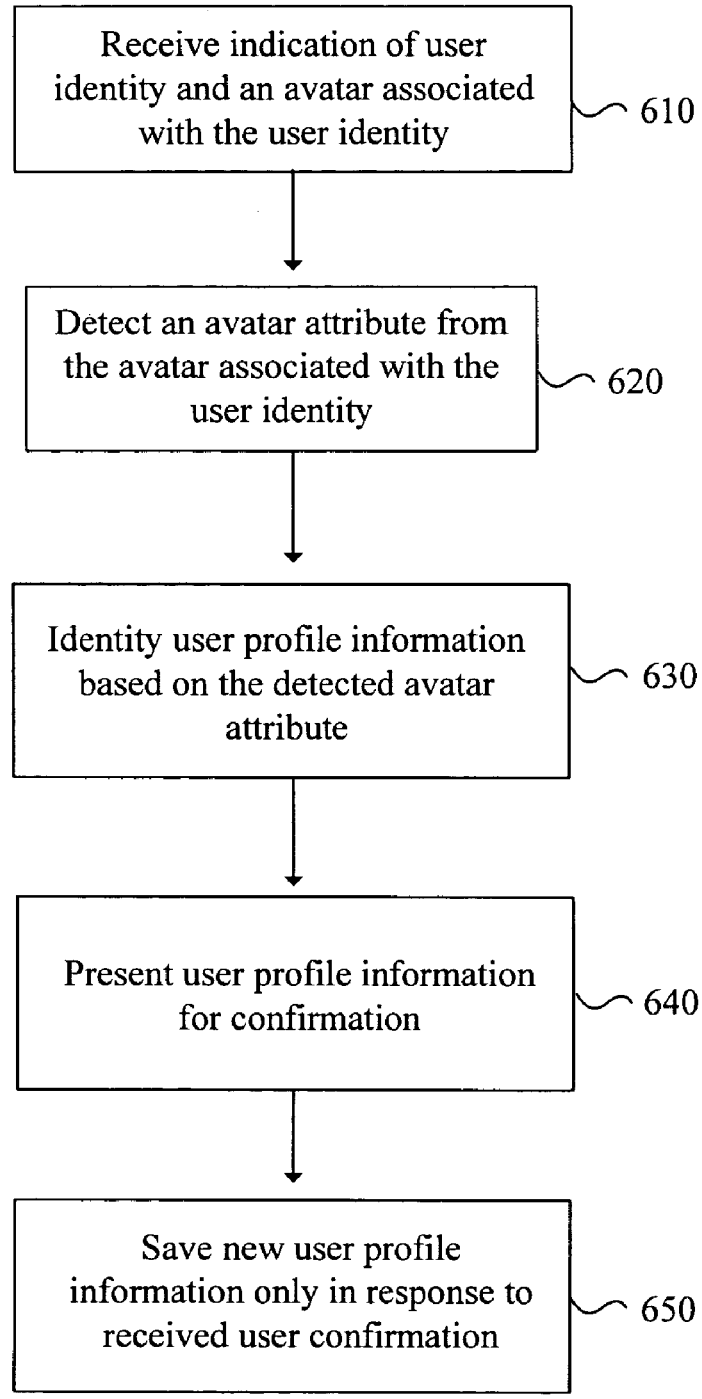
FIGS. 6 and 9 are flow charts of exemplary processes for associating, with a user profile, information detected from an avatar selected by a user.

Referring to FIG. 6, a process 600 is illustrated for associating, with a user profile, information detected from an avatar selected by an instant messaging user. The process 600 may be performed by a processor executing an instant messaging communications program. The process 600 may be initiated, for example, in response to selection of an avatar by a user.

The processor receives an indication of a user identity and an avatar associated with the user identity (step 610). Continuing the example discussed above with respect to FIG. 4 and FIG. 5, the processor receives an indication of the user's identity of "Goldfishrich01" and the avatar associated with that user identity is the avatar 421 of FIG. 4 having an appearance of a Baltimore Ravens football player.

The processor detects attributes associated with that avatar (step 620). For example, the processor detects attributes of Baltimore, Md., Baltimore Ravens, football, and sports. To do so, the processor may access a list of avatars that includes attributes (and other types of descriptive information) that are associated with each avatar and look up the selected avatar on the list to determine whether any attributes are associated with or inferable from the selected avatar. The attributes associated with the avatar may be used as the detected attributes.

The processor identifies user profile information based on the detected avatar attributes (step 630). In some implementations, the processor may provisionally or temporarily associate the detected avatar attributes with user profile information associated with the user identity. To identify user profile information, for example, the processor may determine which fields or types of information in the user profile are related to each of the identified attributes. The processor may access a list of attributes that associates an avatar attribute with a value for a type of information in the user profile. The processor may look up the identified avatar attributes (i.e., the detected attributes) to determine whether any user profile information is able to be associated with detected attributes.

Continuing with the Goldfishrich01 example, the attributes Baltimore and Maryland correspond to a geographical location field in the user profile, and the processor provisionally associates the geographic location of "Baltimore, Md." with the user profile information for the user identity Goldfishrich01. The processor also determines that the attributes of Baltimore Ravens, football, and sports correspond to Hobbies and Interest field, and the processor provisionally associates each of the Baltimore Ravens, football, and sports with the Hobbies & Interests field in the user profile information for the user identity Goldfishrich01.

The processor presents the provisional or proposed user profile information for confirmation, modification or rejection by the user (step 640). The processor creates, or updates, user profile information for the identified user only in response to user confirmation of the presented user profile information (step 650). In this example, the user profile of Goldfishrich01 is updated such that the user profile reflects a Location of Baltimore, Md., and reflects Hobbies & Interests of Baltimore Ravens, football, and sports.

Figure 7:
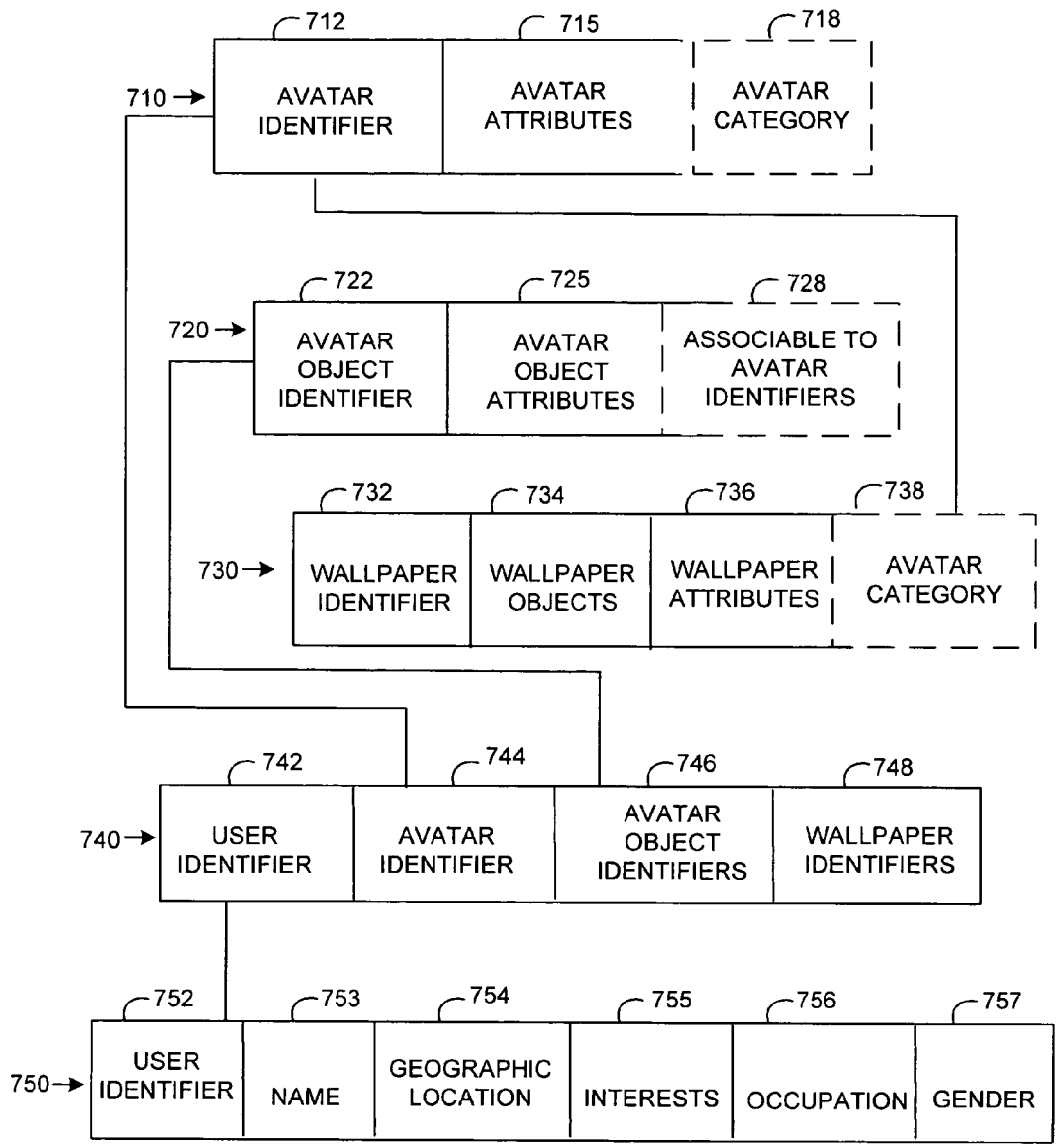
FIG. 7 is a block diagrams of example data structures for use in generating user profile information and presenting avatars for selection by a user.

FIG. 7 depicts example data structures 700 for use in generating user profile information based on a selection of avatar and/or presenting avatars for selection based on user profile information. The example data structures 700 are shown in simplified form.

The data structure 700 includes avatar information 710 having an avatar identifier 712 to uniquely identify an entry in the avatar information 710, attributes 715 associated with the avatar identified by the avatar identifier 712, and optionally, one or more categories 718 to which the avatar belongs. For example, the Baltimore Ravens football player avatar may have attributes 715 of Baltimore, Md., Baltimore Ravens, football, and sports and may be associated with avatar categories 718 of NFL Playoffs 2004, football, and sports.

The data structure 700 also includes avatar object information 720 where each entry represents a self-expression item other than an avatar or wallpaper that is selectable by a user. For example, a self-expression item represented in an entry of avatar object information 720 may be an object, such as a football, a hat, or sunglasses, that may be associated with an avatar. The avatar object information 720 includes an object identifier 722 that uniquely identifies an object, object attributes 725 that are associated with the object identified by the object identifier 722, and, optionally, a list 728 of avatars (identified by an avatar identifier) that may be associated with the object identified by the object identifier 722.

In some implementations, an object may be associated with only one particular avatar. For example, a football jersey object having a particular number and having the appearance of a jersey of a particular football team may only be associated with an avatar may represent the particular football team that has a player using a jersey with the particular number. Some objects, or in this or other implementations, objects need not necessarily only be associated with any particular avatar. Additionally or alternatively, an object may be associated with other types of self-expression items (such as wallpaper, non-animated icons, or other objects).

The data structure 700 also includes wallpaper information 730 that represents wallpaper and includes a wallpaper identifier 732 to uniquely identify a particular wallpaper entry. The wallpaper information 730 also includes wallpaper objects 734 that are associated with, or embedded within, the wallpaper identified by the wallpaper identifier 732. The wallpaper information 730 also includes wallpaper attributes 736 that are associated with the wallpaper identified by the wallpaper identifier 732. The wallpaper information 730 may optionally include a list 738 of avatars that may be associated with the wallpaper.

The data structure 700 also includes user association information 740. Each entry of user association information 740 identifies the avatar, the wallpaper and/or avatar objects selected by a particular user. More particularly, an entry of user association information 740 includes a user identifier 742, such as a user account name or a screen name, identifies a particular user to which the user association applies.

The user association information 740 also includes avatar identifier 744 that identifies the avatar selected by the user to which the user association applies. Information about the avatar, such as attributes associated with the avatar, may be identified by searching avatar information 710 to identify an entry that has an avatar identifier 712 that corresponds to the avatar identifier 744 of the user association information 740.

The user association information 740 also includes one or more avatar object identifiers 746 that identifies each avatar object selected by the user to which the user association applies. Information about each selected avatar object may be identified by searching avatar object information 720 to identify an entry that has an avatar object identifier 725 that corresponds to one of the avatar object identifiers 744 of the user association information 740.

The user association information 740 also includes wallpaper identifier 748 that identifies the wallpaper selected by the user to which the user association applies. Information about the wallpaper may be identified by searching wallpaper information 730 to identify an entry that has an wallpaper identifier 732 that corresponds to the wallpaper identifier 748 of the user association information 740.

The data structure 700 also includes user profile information 750 that represents all or a portion of the user profile information. An entry of user profile information 750 includes a user identifier 752 that uniquely identifies a user identity to which the user profile applies, a user name 753 (such as a first name and last name), a geographical location 754, interests 755, and, optionally, an occupation 756 and, optionally, a gender 757. Using the example of the user profile information of user interface 450 of FIG. 4, the user profile information 750 corresponding to an instant messaging user includes a user identifier 752 of "Goldfishrich01," a user name 753 of "Rich Fish," a geographical location 754 of "Baltimore, Md.," interests 755 of "football, baseball, soccer, and tennis," an occupation 756 of "chef," and a gender 757 of "male." Each of these values may either be entered manually by the user or may be gleaned from attributes that correspond to the user's selection of a particular avatar, wallpaper, or one or more other types of self-expression items, as described previously. The avatar, wallpaper and/or avatar objects selected by a user may be determined by searching user association information 740 to identify an entry that has a user identifier 742 that corresponds to the user identifier 752 of the user profile information 750.

The data structures 710, 720, 730 and 740 are related through the use of avatar identifiers 712, 728, 738 and 744, respectively. The data structure 720 is related to the data structure 740 thorough the use of avatar object identifiers 722 and 746. The data structure 730 is related to the data structure 740 thorough the use of wallpaper identifiers 732 and 748, respectively. The data structure 740 is related to the data structure 750 thorough the use of user identifiers 742 and 752, respectively.

Figure 8A:
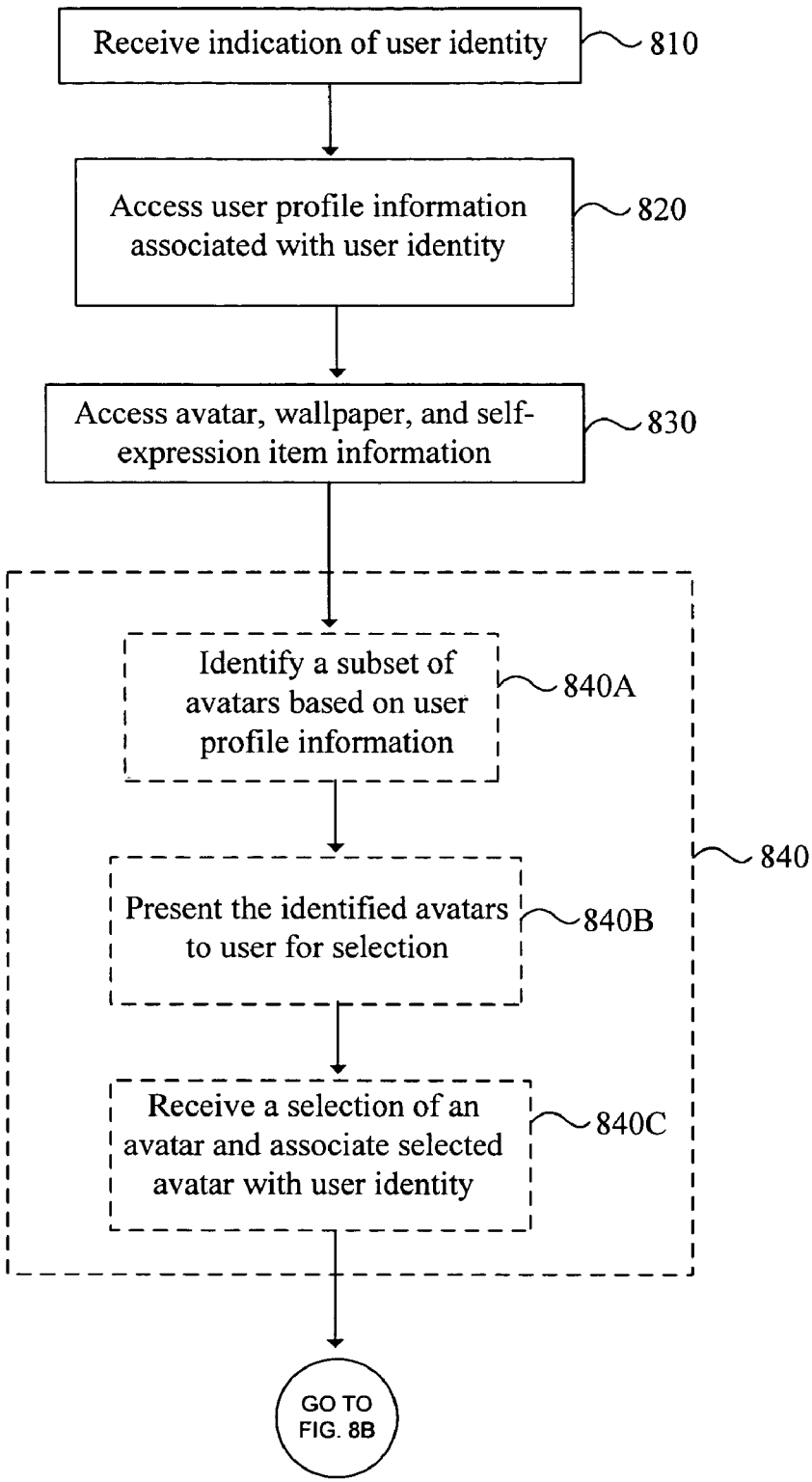
FIGS. 8A and 8B are flow charts of exemplary processes for identifying a subset of avatars, wallpaper, and other self-expression items for presentation for selection by a user.
Figure 8B:
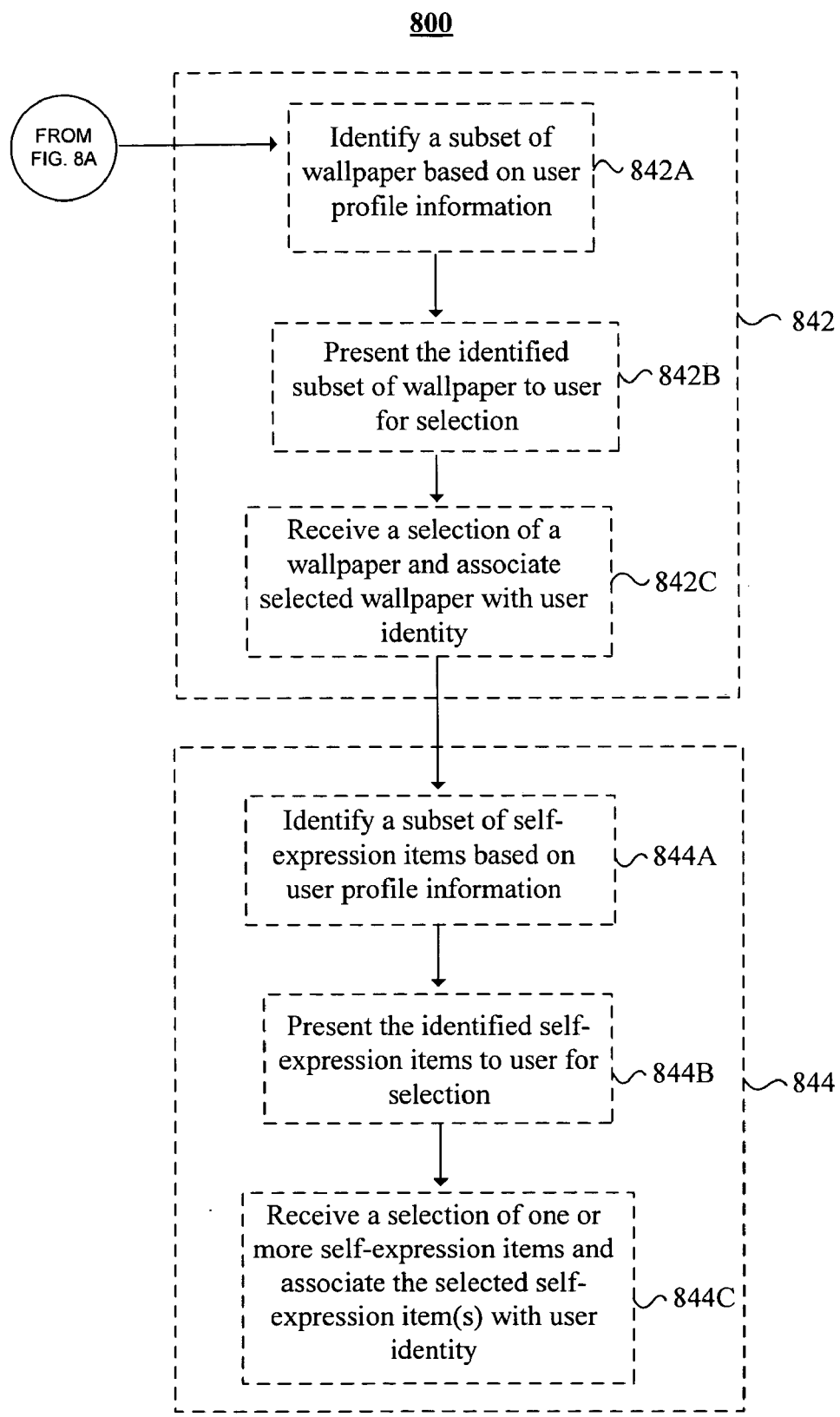

FIGS. 8A and 8B illustrate a process 800 for identifying, based on user profile information, a subset of avatars, wallpaper and other types of self-expression items for selection by a user. More particularly, a subset of available avatars, wallpaper, and self-expression items are identified based on information present in an instant messaging user's user profile. The process 800 is performed by a processor executing an instant messaging communications program. For convenience, references to the data structures 700 of FIG. 7 are made. However, the data structures used by the process 800 need not be the same as those described with respect to FIG. 7, nor are the techniques described with respect to FIG. 8 limited to being performed by the structure and arrangement illustrated by FIG. 7.

The processor receives an indication of a user identity (step 810) and accesses user profile information associated with the user identity (step 820). This may be accomplished, for example, as described previously with respect to steps 510 and 520 of FIG. 5. In another example, processor receives a user identifier and searches user profile information 750 of FIG. 7 to identify an entry that has a user identifier 752 that corresponds to received user identifier.

The processor accesses information relating to the available avatars, wallpaper, and self-expression items (step 830). To do so, the processor may access a list of available avatars, wallpapers and self-expression items and/or reference information related to avatars, wallpapers and self-expression items. In another example, the processor accesses avatar information 710, avatar wallpaper information 730 and avatar object information 720, all of FIG. 7.

The processor identifies a subset of avatars based on user profile information (step 840A). For example, the processor may use the entry of user profile information 750 to identify a subset of avatars that are similar to, or related to, the information in one or more of user profile components (e.g., fields or attributes) 753-757. The processor may identify avatars to be included in the subset based on the avatar attributes 715 that corresponds to one or more values in the user profile components 753-757 of the accessed entry of user profile information 750. The processor also may use a category 718 to which an avatar belongs to determine whether an avatar is to be included in the subset. For example, an avatar that belongs to a category of sports avatars may be included in the subset based on user profile information that indicates an interest in sports.

The processor also presents to the user the subset for selection (step 840B). This may be accomplished, for example, using an user interface similar to the user interface 200 of FIG. 2.

The processor receives, from the user, a selection of an avatar from the subset and associates the new avatar with the user identifier (840C). To do so, for example, the processor may revise an entry in the user association information 740 that corresponds to the user identity to reflect the avatar identifier 744 of the selected avatar. Steps 840A-840C collectively may be referred to as an avatar selection sub-process 840.

The processor identifies a subset of wallpaper based on user profile information (step 842A). For example, the processor may use the entry of user profile information 750 to identify a subset of wallpapers that are similar to, or related to, the information in one or more of user profile components 753-757. The processor may identify wallpaper to be included in the subset based on the wallpaper attributes 736 that correspond to one or more values in the user profile components 753-757 of the accessed entry of user profile information 750. For example, wallpaper attributes 736 may include an attribute that may correspond to one or more entries in one or more types of information included in a user profile, and, as such, may serve as a basis for identifying wallpaper to be presented to a user based on the user profile information of a user. For example, wallpaper attributes 736 may include "cooking" and "chef" which correspond to an interest 755 of "cooking" or an occupation 756 of "chef," respectively.

The processor also may determine whether a particular wallpaper is to be identified for the subset of wallpapers based on whether that wallpaper is associated with the avatar previously selected by the user. To do so, for example, the processor may identify entries in wallpaper information 730 such that the identified entries have an avatar identifier that corresponds to an avatar identifier listed in associable 738 to avatar identifiers of the entry of wallpaper information 730.

The processor presents to the user the identified subset of wallpaper for selection (step 842B). This may be presented, for example, in a user interface that is similar to the user interface 200 of FIG. 2.

The processor receives a selection of a wallpaper and associates the selected wallpaper with the user identity (step 842C). To do so, for example, the processor may revise an entry in the user association information 740 that is associated with the user identity to reflect a wallpaper identifier 748 of the selected wallpaper. Steps 842A-842C collectively may be referred to as a wallpaper selection sub-process 840.

The processor identifies, based on user profile information, a subset of self-expression items that are not wallpaper or avatars (step 844A). For example, the processor may use the entry of user profile information 750 to identify a subset of avatar objects that are similar to, or related to, the information in one or more of the user profile components 753-757. The processor may identify avatar objects for the subset based on avatar object attributes 726 that correspond to one or more values in the user profile components 753-757 of the access user profile information 750. The processor also may use the associable 728 to avatar identifiers of an entry of avatar object information 720 to determine whether an entry is to be included in a subset of avatar objects presented to the user.

The processor presents the identified self-expression items to the user for selection of one or more self-expression items (step 844B). The processor receives a selection of one or more self-expression items and associates the received selections with the user identity (step 844C). To do so, for example, the processor may revise an entry in the link data information 740 that is associated with the user identity to reflect the identifiers of each of the one or more self-expression items as avatar object identifiers 746. Steps 844A-844C collectively may be referred to as a self-expression item selection process 844.

In some implementations, the user may control which of the sub-processes, 840, 842, and 844 are executed. For example, a user may select an control from a menu that initiates the execution of one of the sub-processes 840, 842 or 844. Alternatively or additionally, the processor may query the user concerning whether the user desires to perform one or more of the sub-processes 840, 842 or 844 to select an avatar, a wallpaper or other types of self-expression items, respectively.

The process 800 provides an example of using user profile information to identify avatars, wallpapers and/or objects associated with avatars for selection by a user. Similar techniques may be used to suggest customized triggers to be associated with an avatar, non-animated icons, and other types of self-expression items, such as objects that are to be displayed near an avatar that are not necessarily associated with the avatar. For example, an affiliation with a university indicated in a user profile may be used to suggest a hat displaying the university emblem to be placed in the surroundings of an avatar.

The geographic location, occupation, and interests have been used to illustrate types of user profile information that may be used in the process 800. Other types of user profile information and other types of interests also may be used. Examples of other types of interests include, for example, an interest in books and writing; one or more types of careers or vocations; cars; geographic locations or communities (that may not necessarily reflect a geographic location in which the user resides); fashion; games; health and fitness; investing; particular hobbies (such as antiques, bird watching; photography; science fiction; and the arts); house and garden; movies; music and/or specific types of music (such as jazz, rock, and classical music); religion; television and radio; and/or travel.

Figure 9:
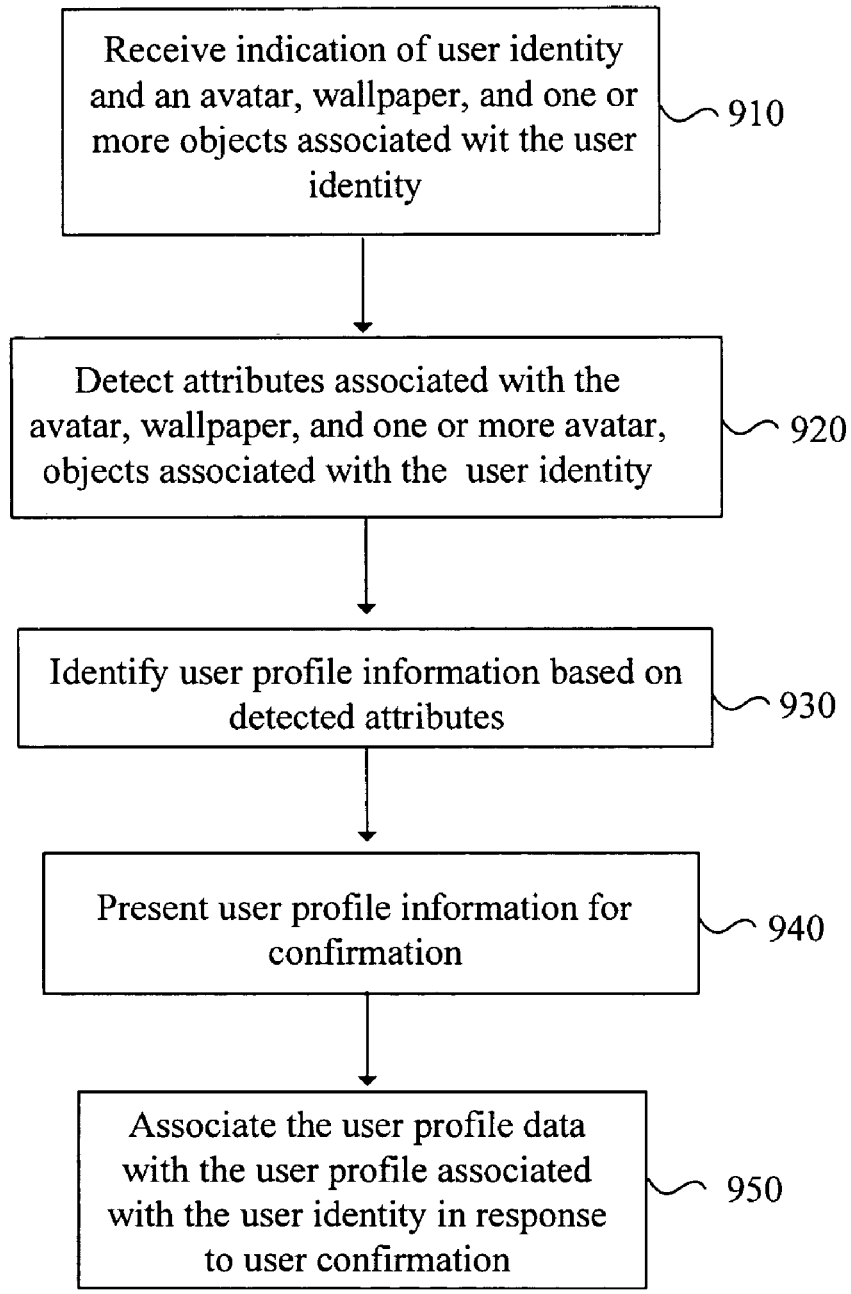

FIG. 9 depicts a process 900 is illustrated for associating information detected from an avatar selected by an instant messaging user with a user profile corresponding to the instant messaging user. The process 900 may be performed by a processor executing an instant messaging communications program. For convenience, references to the data structures 700 of FIG. 7 are made. As would be recognized by one skilled in the art, however, the data structures used by the process 900 need not be the same as those described with respect to FIG. 7, nor are the techniques described with respect to FIG. 9 limited to being performed by the structure and arrangement illustrated by FIG. 7.

The process 900 may be initiated, for example, in response to selection of an avatar, wallpaper and one or more self-expression items by a user. The processor receives an indication of a user identity and an avatar, wallpaper, and one or more self-expression items associated with the user identity (step 910). In one example, the processor may receive a user identifier as an indication of a user identity and an entry of user association information 740 associated with the user identity. The entry of user association information 740 includes an avatar identifier 744 that identifies an avatar associated with the user, a wallpaper identifier 748 that identifies wallpaper associated with the user, and avatar object identifiers 746 that identify self-expression items associated with the user.

The processor detects the attributes associated with the avatar, wallpaper, and one or more self-expression items (step 920). To do so, for example, the processor may search avatar information 710 for an entry that includes the avatar identifier 744 of the received entry of user association information 740 and, when found, may use attributes 715 of the identified entry of avatar information as the detected avatar attributes. Similarly, the processor may search wallpaper information 730 for an entry that includes the wallpaper identifier 756 of the received entry of user association information 740 and, when found, may use attributes 734 of the identified entry of wallpaper information as the detected wallpaper attributes.

The processor may search avatar object information 720 for an entries that include an avatar object identifier 722 of the received entry of user association information 740 and, when found, use the avatar object attributes 725 as the detected avatar object attributes.

The processor identifies user profile information based on detected attributes (step 930). For example, the processor may look up each detected attribute on a list of attributes to determine whether the detected attribute corresponds to a component of user profile information, such as a component 754-757 of user profile information 750.

The processor presents the identified user profile information for confirmation or rejection by the user (step 940), and, the processor creates, or updates, an entry of user profile information 750 for the identified user only in response to user confirmation (step 950). This may be accomplished, for example, as described previously with respect to steps 640 and 650 of FIG. 6.

The process 900 provides an example of using an avatar, wallpaper and/or objects associated with avatars to generate user profile information. Similar techniques may be used to generate user profile information that is based on triggers associated with avatars (particularly, for example, triggers that are customized by a user for use with an avatar) and objects that are to be displayed near an avatar. For example, a hat with a university emblem that displayed on a coat rack in the surroundings of the avatar may be used to generate user profile information that indicates an affiliation with the university identified on the hat.

Figure 10:
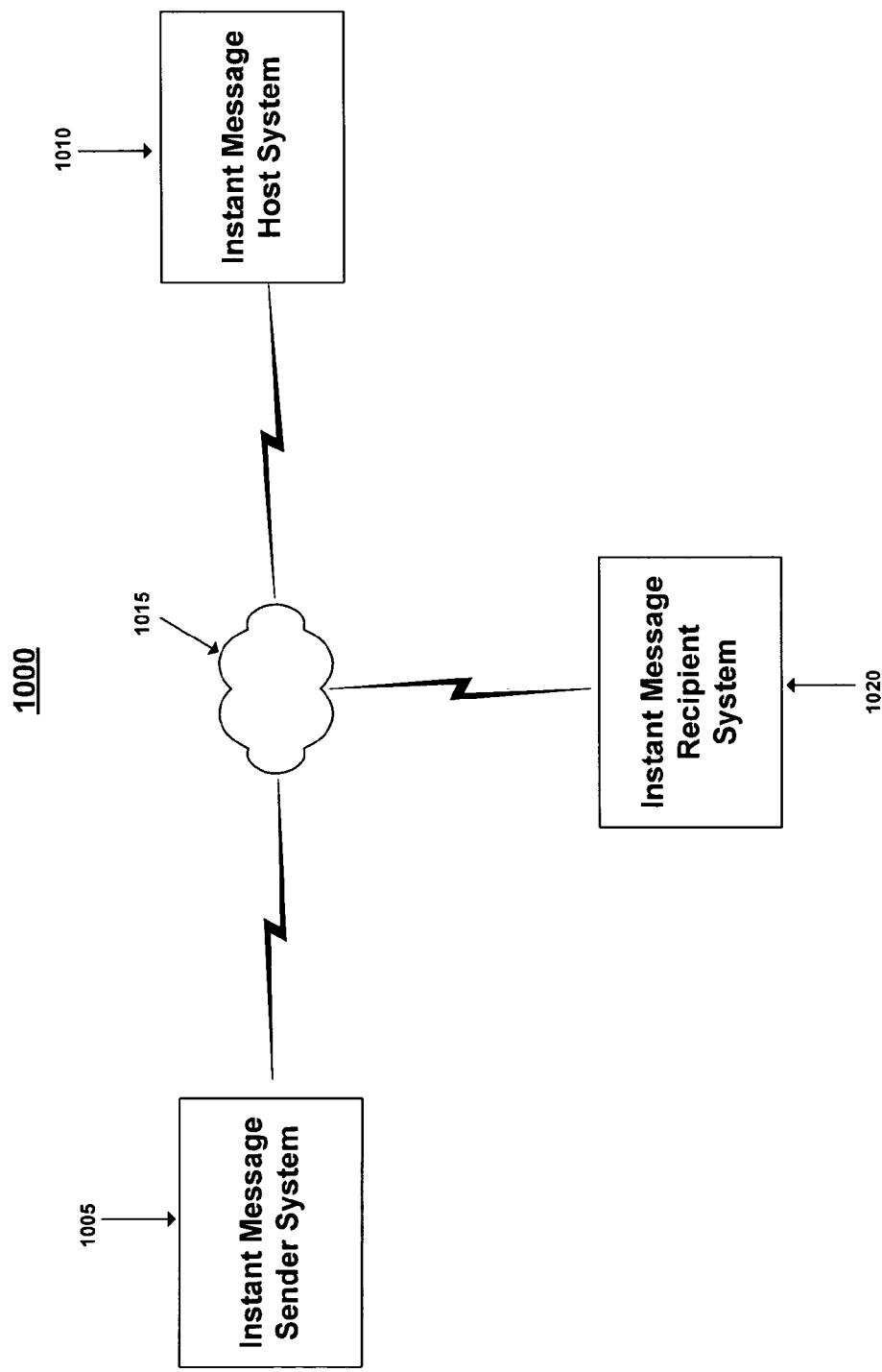
FIGS. 10-12 are diagrams of exemplary communications systems capable of enabling an instant message user to project an avatar for self-expression.

FIG. 10 illustrates a communications system 1000 that includes an instant message sender system 1005 capable of communicating with an instant message host system 1010 through a communication link 1015. The communications system 1000 also includes an instant message recipient system 1020 capable of communicating with the instant message host system 1010 through the communication link 1015. Using the communications system 1000, a user of the instant message sender system 1005 is capable of exchanging communications with a user of the instant message recipient system 1020. The communications system 1000 is capable of animating avatars for use in self-expression by an instant message sender.

In one implementation, any of the instant message sender system 1005, the instant message recipient system 1020, or the instant message host system 1010 may include one or more general-purpose computers, one or more special-purpose computers (e.g., devices specifically programmed to communicate with each other), or a combination of one or more general-purpose computers and one or more special-purpose computers. By way of example, the instant message sender system 1005 or the instant message recipient system 1020 may be a personal computer or other type of personal computing device, such as a personal digital assistant or a mobile communications device. In some implementations, the instant message sender system 1005 and/or the instant message recipient 1020 may be a mobile telephone that is capable of receiving instant messages.

The instant message sender system 1005, the instant message recipient system 1020 and the instant message host system 1010 may be arranged to operate within or in concert with one or more other systems, such as, for example, one or more LANs ("Local Area Networks") and/or one or more WANs ("Wide Area Networks"). The communications link 1015 typically includes a delivery network (not shown) that provides direct or indirect communication between the instant message sender system 1005 and the instant message host system 1010, irrespective of physical separation. Examples of a delivery network include the Internet, the World Wide Web, WANs, LANs, analog or digital wired and wireless telephone networks (e.g., Public Switched Telephone Network (PSTN), Integrated Services Digital Network (ISDN), and various implementations of a Digital Subscriber Line (DSL)), radio, television, cable, or satellite systems, and other delivery mechanisms for carrying data. The communications link 1015 may include communication pathways (not shown) that enable communications through the one or more delivery networks described above. Each of the communication pathways may include, for example, a wired, wireless, cable or satellite communication pathway.

The instant message host system 1010 may support instant message services irrespective of an instant message sender's network or Internet access. Thus, the instant message host system 1010 may allow users to send and receive instant messages, regardless of whether they have access to any particular Internet service provider (ISP). The instant message host system 1010 also may support other services, including, for example, an account management service, a directory service, and a chat service. The instant message host system 1010 has an architecture that enables the devices (e.g., servers) within the instant message host system 1010 to communicate with each other. To transfer data, the instant message host system 1010 employs one or more standard or proprietary instant message protocols.

To access the instant message host system 1010 to begin an instant message session in the implementation of FIG. 10, the instant message sender system 1005 establishes a connection to the instant message host system 1010 over the communication link 1015. Once a connection to the instant message host system 1010 has been established, the instant message sender system 1005 may directly or indirectly transmit data to and access content from the instant message host system 1010. By accessing the instant message host system 1010, an instant message sender can use an instant message client application located on the instant message sender system 1005 to view whether particular users are online, view whether users may receive instant messages, exchange instant messages with particular instant message recipients, participate in group chat rooms, trade files such as pictures, invitations or documents, find other instant message recipients with similar interests, get customized information such as news and stock quotes, and search the Web. The instant message recipient system 1020 may be similarly manipulated to establish contemporaneous connection with instant message host system 1010.

Furthermore, the instant message sender may view or perceive an avatar and/or other aspects of an online persona associated with the instant message recipient prior to engaging in communications with an instant message recipient. For example, certain aspects of an instant message recipient-selected personality, such as an avatar chosen by the instant message recipient, may be perceivable through the buddy list itself prior to engaging in communications. Other aspects of a selected personality chosen by an instant message recipient may be made perceivable upon opening of a communication window by the instant message sender for a particular instant message recipient but prior to initiation of communications. For example, animations of an avatar associated with the instant message sender only may be viewable in a communication window, such as the user interface 100 of FIG. 1.

In one implementation, the instant messages sent between instant message sender system 1005 and instant message recipient system 1020 are routed through the instant message host system 1010. In another implementation, the instant messages sent between instant message sender system 1005 and instant message recipient system 1020 are routed through a third party server (not shown), and, in some cases, are also routed through the instant message host system 1010. In yet another implementation, the instant messages are sent directly between instant message sender system 1005 and instant message recipient system 1020.

The techniques, processes and concepts in this description may be implemented using communications system 1000. One or more of the processes may be implemented in a client/host context, a standalone or offline client context, or a combination thereof. For example, while some functions of one or more of the processes may be performed entirely by the instant message sender system 1005, other functions may be performed by host system 1010, or the collective operation of the instant message sender system 1005 and the host system 1010. By way of example, the avatar of an instant message sender may be respectively selected and rendered by the standalone/offline device, and other aspects of the online persona, such as selected wallpaper or one or more self-expression items, of the instant message sender may be accessed or updated through a remote device in a non-client/host environment such as, for example, a LAN server serving an end user or a mainframe serving a terminal device.

Figure 11:
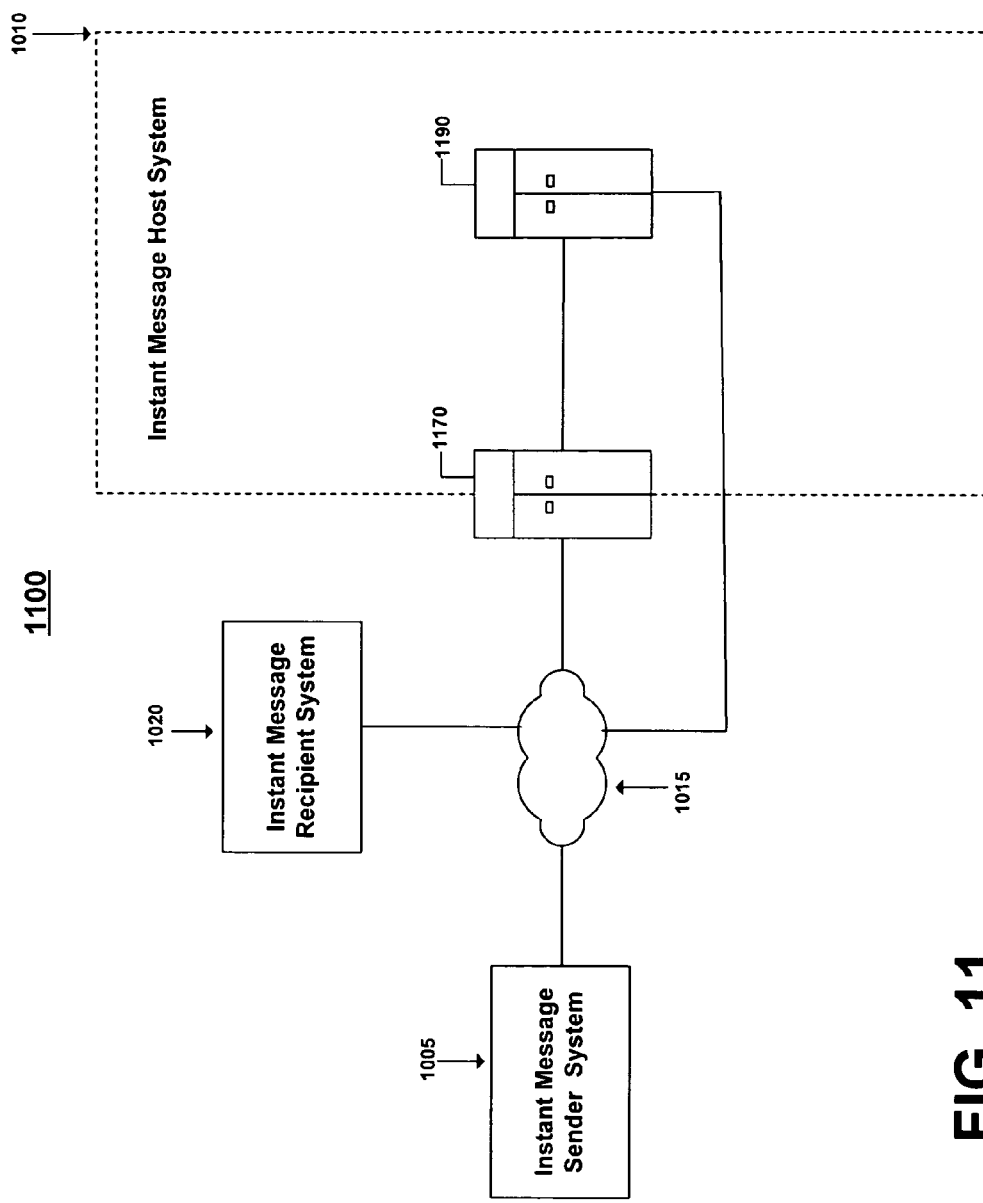

FIG. 11 illustrates a communications system 1100 that includes an instant message sender system 1005, an instant message host system 1010, a communication link 1015, and an instant message recipient 1020. System 1100 illustrates another possible implementation of the communications system 1000 of FIG. 10 that is used for animating avatars used for self-expression by an instant message sender.

In contrast to the depiction of the instant message host system 1010 in FIG. 10, the instant message host system 1010 includes a login server 1170 for enabling access by instant message senders and routing communications between the instant message sender system 1005 and other elements of the instant message host system 1010. The instant message host system 1010 also includes an instant message server 1190. To enable access to and facilitate interactions with the instant message host system 1010, the instant message sender system 1005 and the instant message recipient system 1020 may include communication software, such as for example, an online service provider client application and/or an instant message client application.

In one implementation, the instant message sender system 1005 establishes a connection to the login server 1170 in order to access the instant message host system 1010 and begin an instant message session. The login server 1170 typically determines whether the particular instant message sender is authorized to access the instant message host system 1010 by verifying the instant message sender's identification and password. If the instant message sender is authorized to access the instant message host system 1010, the login server 1170 usually employs a hashing technique on the instant message sender's screen name to identify a particular instant message server 1190 within the instant message host system 1010 for use during the instant message sender's session. The login server 1170 provides the instant message sender (e.g., instant message sender system 1005) with the Internet protocol address of the instant message server 1190, gives the instant message sender system 1005 an encrypted key, and breaks the connection. The instant message sender system 1005 then uses the IP address to establish a connection to the particular instant message server 1190 through the communications link 1015, and obtains access to the instant message server 1190 using the encrypted key. Typically, the instant message sender system 1005 will be able to establish an open TCP connection to the instant message server 1190. The instant message recipient system 1020 establishes a connection to the instant message host system 1010 in a similar manner.

In one implementation, the instant message host system 1010 also includes a user profile server (not shown) connected to a database (not shown) for storing large amounts of user profile data. The user profile server may be used to enter, retrieve, edit, manipulate, or otherwise process user profile data. In one implementation, an instant message sender's profile data includes, for example, the instant message sender's screen name or user identifier, buddy list, identified interests, and geographic location, as well as the user's name, occupation and gender. The instant message sender's profile data may also include an avatar, wallpaper, or one or more self-expression items selected by the instant message sender. The instant message sender may enter, edit and/or delete profile data using an installed instant message client application on the instant message sender system 1105 to interact with the user profile server. Additionally, user profile data may be entered, edited, and/or deleted in response to a selection by the user of an avatar, wallpaper, or one or more self-expression items that have attributes that correspond to the user. Although the system will propose new user profile data to the instant message sender, the actual editing of the existing user profile data is subject to verification and agreement by the user.

Because the instant message sender's data are stored in the instant message host system 1010, the instant message sender does not have to reenter or update such information in the event that the instant message sender accesses the instant message host system 1010 using a new or different instant message sender system 1005. Accordingly, when an instant message sender accesses the instant message host system 1010, the instant message server can instruct the user profile server to retrieve the instant message sender's profile data from the database and to provide, for example, the instant message sender's avatar, wallpaper, and one or more self-expression items, as well as the user's buddy list to the instant message server. Alternatively, user profile data may be saved locally on the instant message sender system 1005.

Figure 12:
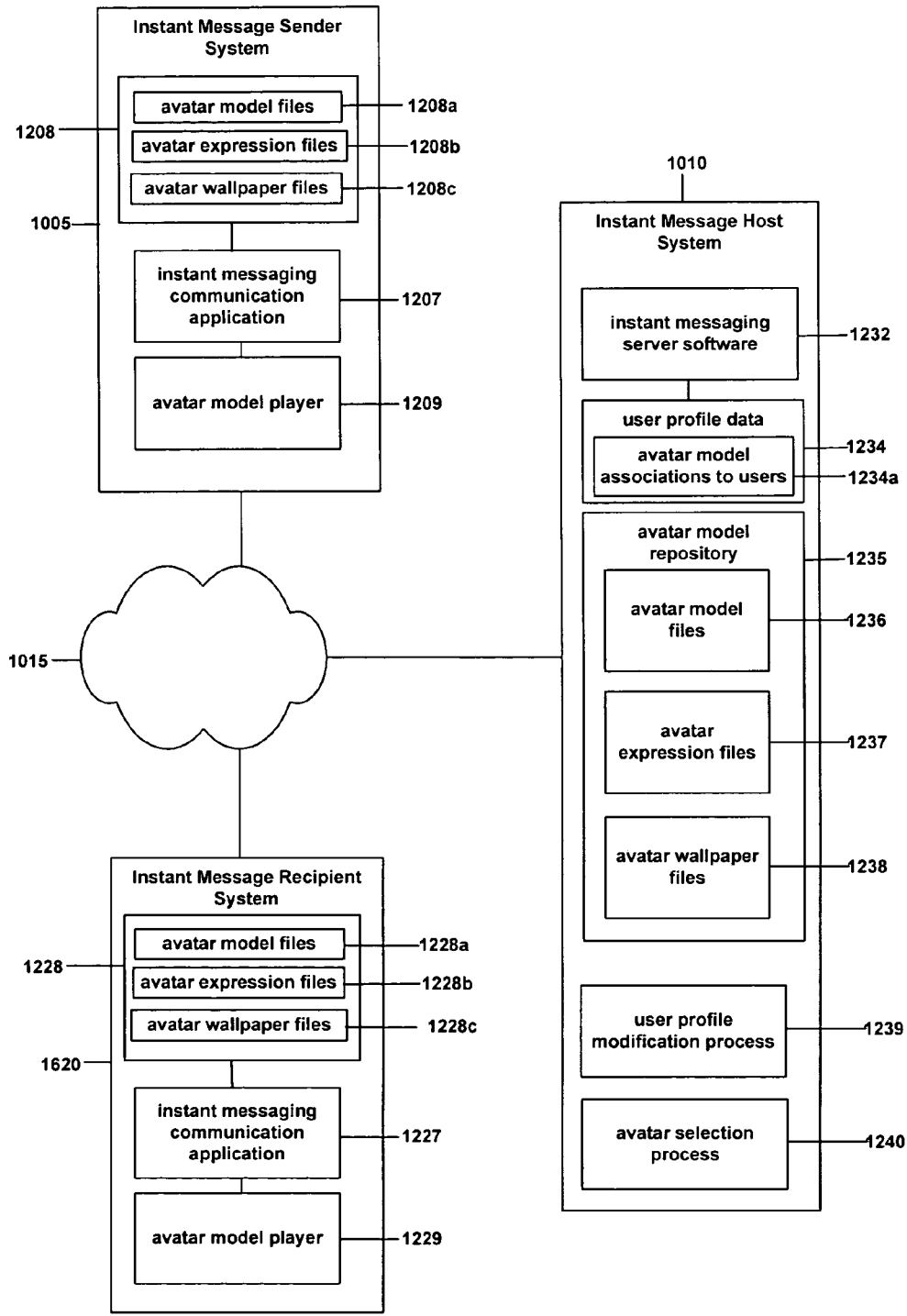

FIG. 12 illustrates another example communications system 1200 capable of exchanging communications between users that project avatars for self-expression. The communications system 1200 includes an instant message sender system 1005, an instant message host system 1010, a communications link 1015 and an instant message recipient system 1020.

The host system 1010 includes instant messaging server software 1232 routing communications between the instant message sender system 1005 and the instant message recipient system 1020. The instant messaging server software 1232 may make use of user profile data 1234. The user profile data 1234 includes indications of an avatar, wallpaper, and one or more self-expression items selected by an instant message sender. The user profile data 1234 also includes associations 1234a of avatar models with users (e.g., instant message senders). The user profile data 1234 may be stored, for example, in a database or another type of data collection, such as a series of extensible mark-up language (XML) files. In some implementations, some portions of the user profile data 1234 may be stored in a database while other portions, such as associations 1234a of avatar models with users, may be stored in an XML file.

The host system 1010 also includes software defining the user profile modification process 1239 and software defining the avatar selection process 1240. Both of the software modules make use of the user profile data 1234. The user profile modification process software 1239 enters, edits, and/or deletes user profile data such that attributes associated with an avatar, wallpaper, or one or more self-expression items selected by the instant message user are detected. The processor then matches the detected attributes will possible values for one or more fields within the user profile data 1234. When the fields are matched with information that corresponds to the user, the processor presents the proposed user profile data to the user. If the data is verified and the user agrees, the user profile data 1234 is updated with the changes based on the attributes of the avatar, wallpaper, or one or more self-expression items.

The avatar selection process software 1240 receives an indication of a user identifier and user profile data associated with the user identity. The processor detects information from the user profile data and uses the information to identity a subset of available avatars, wallpaper, and/or self-expression items that correspond to the user information. The subsets are then presented to the user for selection of an avatar, wallpaper, or one or more self-expression items. The user may select a new avatar, wallpaper, or one or more self-expression items, or may retain those the user has already selected. If the user makes one or more selections, the software may then associate the new avatar, wallpaper, and/or one or more self-expression items with the user identifier.

One implementation of user profile data 1234 appears in the table below. In this example, the user profile data includes a screen name, or user identifier, to uniquely identify the user for whom the user profile data applies, a password for signing-on to the instant message service, an avatar associated with the user, and an optional online persona. As shown in Table 1, a user may have multiple online personas, each associated with the same or a different avatar.

TABLE 1

| Screen Name | Password | Avatar | Online Persona |
|---|---|---|---|
| Robert_Appleby | 5846%JYNG | Clam | Work |
| Robert_Appleby | 5846%JYNG | Starfish | Casual |
| Susan_Merit | 6748#474V | Dolphin | |
| Bill_Smith | JHG7868$0 | Starfish | Casual |
| Bill_Smith | JHG7868$0 | Starfish | Family |
| Greg_Jones | 85775$#59 | Frog | |

The host system 1010 also includes an avatar model repository 1235 in which definitions of avatars that may be used in the instant message service are stored. In this implementation, an avatar definition includes an avatar model file, an avatar expression file for storing instructions to control the animation of the avatar, and wallpaper file. Thus, the avatar model repository 1235 includes avatar model files 1236, avatar expression files 1237 and avatar wallpaper files 1238.

The avatar model files 1236 define the appearance and animations of each of the avatars included in the avatar model repository 1235. Each of the avatar model files 1236 defines the mesh, texture, lighting, sounds, and animations used to render an avatar. The mesh of a model file defines the form of the avatar, and the texture defines the image that covers the mesh. The mesh may be represented as a wire structure composed of a multitude of polygons that may be geometrically transformed to enable the display of an avatar to give the illusion of motion. In one implementation, lighting information of an avatar model file is in the form of a light map that portrays the effect of a light source on the avatar. The avatar model file also includes multiple animation identifiers. Each animation identifier identifies a particular animation that may be played for the avatar. For example, each animation identifier may identify one or more morph targets to describe display changes to transform the mesh of an avatar and display changes in the camera perspective used to display the avatar.

When an instant message user projects an avatar self-expression, it may be desirable to define an avatar with multiple animations, including facial animations, to provide more types of animations usable by the user for self-expression. Additionally, it may be desirable for facial animations to use a larger number of blend shapes, which may result in an avatar that, when rendered, may appears more expressive. A blend shape defines a portion of the avatar that may be animated and, in general, the more blend shapes that are defined for an animation model, the more expressive the image rendered from the animation model may appear.

Various data management techniques may be used to implement the avatar model files. In some implementations, information to define an avatar may be stored in multiple avatar files that may be arranged in a hierarchical structure, such as a directory structure. In such a case, the association between a user and an avatar may be made through an association of the user with the root file in a directory of model files for the avatar.

In one implementation, an avatar model file may include all possible appearances of an avatar, including different features and props that are available for user-customization. In such a case, user preferences for the appearance of the user's avatar include indications of which portions of the avatar model are to be displayed, and flags or other indications for each optional appearance feature or prop may be set to indicate whether the feature or prop is to be displayed. By way of example, an avatar model may be configured to display sunglasses, reading glasses, short hair and long hair. When a user configures the avatar to wear sunglasses and have long hair, the sunglasses feature and long hair features are turned on, the reading glasses and short hair features are turned off, and subsequent renderings of the avatar display the avatar having long hair and sunglasses.

The avatar model repository 1235 also includes avatar expression files 1237. Each of the avatar expression files 1237 defines triggers that cause animations in the avatars. For example, each of the avatar expression files 1237 may define the text triggers that cause an of animation when the text trigger is identified in an instant message. An avatar expression file also may store associations between out-of-band communication indicators and animations that are played when a particular out-of-band communication indicator is detected. One example of a portion of an avatar expression file is depicted in Table 2 below.

TABLE 2

| ANIMATION TYPE | TRIGGERS | OUT-OF-BAND COMMUNICATION INDICATORS |
|---|---|---|
| SMILE | :) :-) Nice | |
| GONE AWAY | bye brb cu gtg cul bbl gg b4n ttyl ttfn | Instruction to shut down computer |
| SLEEP | Zzz tired sleepy snooze | Time is between 1 a.m. and 5 a.m. |
| WINTER CLOTHES | | Date is between November 1 and March 1 |
| RAIN | | Weather is rain |
| SNOW | | Weather is snow |

In some implementations, the association between a particular animation for a particular animation identifier is indirectly determined for a particular trigger or out-of-band communication indicator. For example, a particular trigger or out-of-band communication indicator may be associated with a type of animation (such as a smile, gone away, or sleep), as illustrated in Table 2. A type of animation also may be associated with a particular animation identifier included in a particular avatar model file, as illustrated in Table 3 below. In such a case, to play an animation based on a particular trigger or out-of-band communication indicator, the type of animation is identified, the animation identifier associated with the identified type of animation is determined, and the animation identified by the animation identifier is played. Other computer animation and programming techniques also may be used. For example, each avatar may use the same animation identifier for a particular animation type rather than including the avatar name shown in the table. Alternatively or additionally, the association of animation types and animation identifiers may be stored separately for each avatar.

TABLE 3

| ANIMATION TYPE | ANIMATION IDENTIFIER | AVATAR NAME |
| --- | --- | --- |
| SMILE | 1304505 | DOLPHIN |
| SMILE | 5858483 | FROG |
| GONE AWAY | 4848484 | DOLPHIN |

The avatar expression files 1237 also include information to define the way that an avatar responds to an animation of another avatar. In one implementation, an avatar expression file includes pairs of animation identifiers. One of the animation identifiers in each pair identifies a type of animation that, when the type of animation is played for one avatar, triggers an animation that is identified by the other animation identifier in the pair in another avatar. In this manner, the avatar expression file may define an animation played for an instant message recipient's avatar in response to an animation played by an instant message sender's avatar. In some implementations, the avatar expression files 1237 may include XML files having elements for defining the text triggers for each of the animations of the corresponding avatar and elements for defining the animations that are played in response to animations seen from other avatars.

The avatar model repository 1235 also includes avatar wallpaper files 1238 that define the wallpaper over which an avatar is drawn. The wallpaper may be defined using the same or different type of file structure as the avatar model files. For example, an avatar model file may be defined as an animation model file that is generated and playable using animation software from Viewpoint Corporation of New York, N.Y., whereas the wallpaper files may be in the form of a Macromedia Flash file that is generated and playable using animation software available from Macromedia, Inc. of San Francisco, Calif. When wallpaper includes animated objects that are triggered by an instant message, an out-of-band communication indicator or an animation of an avatar, the avatar wallpaper files 1238 also may include one or more triggers that are associated with the wallpaper animation. Additionally, in some implementations, the avatar model repository 1235 also includes self-expression files (not shown) associated with particular avatars or particular wallpaper files.

Each of the instant message sender system 1005 and the instant message recipient system 1020 includes an instant messaging communication application 1207 or 1227 that capable of exchanging instant messages over the communications link 1015 with the instant message host system 1010. The instant messaging communication application 1207 or 1227 also may be referred to as an instant messaging client.

Each of the instant message sender system 1005 and the instant message recipient system 1020 also includes avatar data 1208 or 1228. The avatar data 1208 or 1228 include avatar model files 1208a or 1228a, avatar expression files 1208b or 1228b, and avatar wallpaper files 1208c or 1228c for the avatars that are capable of being rendered by the instant message sender system 1005 or the instant message recipient system 1020, respectively. The avatar data 1208 or 1228 may be stored in persistent storage, transient storage, or stored using a combination of persistent and transient storage. When all or some of the avatar data 1208 or 1228 is stored in persistent storage, it may be useful to associate a predetermined date on which some or all of the avatar data 1208 or 1228 is to be deleted from the instant message sender system 1005 or the instant message recipient system 1020, respectively. In this manner, avatar data may be removed from the instant message sender system 1005 or the instant message recipient system 1020 after the data has resided on the instant message sender system 1005 or 1020 for a predetermined period of time and presumably is no longer needed. This may help reduce the amount of storage space used for instant messaging on the instant message sender system 1005 or the instant message recipient system 1020.

In one implementation, the avatar data 1208 or 1228 is installed on the instant message sender system 1005 or the instant message recipient system 1020, respectively, with the instant messaging client software installed on the instant message sender system 1005 or the instant message recipient system 1020. In another implementation, the avatar data 1208 or 1228 is transmitted to the instant message sender system 1005 or the instant message recipient system 1020, respectively, from the avatar model repository 1235 of the instant messaging host system 1010. In yet another implementation, the avatar data 1208 or 1228 is copied from a source unrelated to instant messaging and stored for use as instant messaging avatars on the instant message sender system 1005 or the instant message recipient system 1020, respectively. In yet another implementation, the avatar data 1208 or 1228 is sent to the instant message sender system 1005 or the instant message recipient system 1020, respectively, with or incident to instant messages sent to the instant message sender system 1005 or the instant message recipient system 1020. The avatar data sent with an instant message corresponds to the instant message sender that sent the message.

The avatar expression files 1208b or 1228b are used to determine when an avatar is to be rendered on the instant message sender system 1005 or the instant message recipient 1020, respectively. To render an avatar, one of the avatar model files 1208a is displayed on the two-dimensional display of the instant messaging system 1005 or 1020 by an avatar model player 1209 or 1229, respectively. In one implementation, the avatar model player 1208 or 1229 is an animation player by Viewpoint Corporation. More particularly, the processor of the instant messaging system 1005 or 1020 calls the avatar model player 1209 or 1229 and identifies an animation included in one of the avatar model files 1208a or 1228a. In general, the animation is identified by an animation identifier in the avatar model file. The avatar model player 1209 or 1229 then accesses the avatar model file and plays the identified animation.

In some implementations, the avatars from which a user may select may be limited based on a user characteristic, such as age. As illustrated in Table 4 below, only as an example, a user who is under the age of 10 may be limited to one group of avatars. A user who is between 10 and 18 may be limited to a different group of avatars, some of which are the same as the avatars selectable by users under the age of 10. A user who is 18 or older may select from any avatar available from the instant message provider service.

TABLE 4

| USER AGE | AVATAR NAMES |
| --- | --- |
| Less than age 10 | Sheep, Cow, Dolphin, Happy, Starfish, Dragon, Polly |
| Age 10 to 18 | Sheep, Cow, Dolphin, Happy, Starfish, Dragon, Polly, Robot, Frog, T-Rex, Parrot, Boxing Glove, Snake, Monster, Parrot |
| Age 18 or older | Sheep, Cow, Dolphin, Happy, Starfish, Dragon, Polly, Robot, Frog, T-Rex, Parrot, Boxing Glove, Snake, Monster, Parrot, Lips, Pirate Skull |

Instant messaging programs typically allow instant message senders to communicate in real-time with each other in a variety of ways. For example, many instant messaging programs allow instant message senders to send text as an instant message, to transfer files, and to communicate by voice. Examples of instant messaging communication applications include AIM (America Online Instant Messenger), AOL (America Online) Buddy List and Instant Messages which is an aspect of many client communication applications provided by AOL, Yahoo Messenger, MSN Messenger, and ICQ, among others. Although discussed above primarily with respect to instant message applications, other implementations are contemplated for providing similar functionality in platforms and online applications. For example, the techniques and concepts may be applied to an animated avatar that acts as an information assistant to convey news, weather, and other information to a user of a computer system or a computing device.

The techniques and concepts generally have been described in the context of an instant messaging system that uses an instant messaging host system to facilitate the instant messaging communication between instant message senders and instant message recipients. Other instant message implementations are contemplated, such as an instant message service in which instant messages are exchanged directly between an instant message sender system and an instant message recipient system.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A method for generating user profile information, the method comprising:
   accessing a stored user profile corresponding to a user, the user profile including user profile data types and values of the user profile data types;
   accessing an avatar selected to represent the user in an instant messaging exchange;
   detecting attributes of the selected avatar;
   accessing a data structure that associates avatar attributes and user profile data types;
   determining, based on associations in the accessed data structure, user profile data types that correspond to the detected attributes; and
   based on results of the determining, updating values of the user profile data types in the accessed user profile to reflect the detected attributes.

2. The method of claim 1, wherein the user profile data types in the accessed user profile include a name data type, a geographic location data type, a hobby and interest data type, and an occupation data type.

3. The method of claim 2, wherein detecting attributes of the selected avatar comprises:
   detecting at least one of a geographic location associated with the selected avatar, a hobby or interest associated with the selected avatar, and an occupation associated with the selected avatar.

4. The method of claim 1, wherein detecting attributes of the selected avatar comprises:
   accessing a data structure that associates avatars and avatar attributes; and
   detecting attributes of the selected avatar using the accessed data structure that associates avatars and avatar attributes.

5. The method of claim 1, wherein accessing the stored user profile corresponding to a user includes accessing the stored user profile to direct advertisements to the user.

6. The method of claim 5, wherein accessing the stored user profile corresponding to a user includes accessing the stored user profile only to direct advertisements to the user.

7. The method of claim 1, wherein determining, based on associations in the accessed data structure, user profile data types comprises determining a user characteristic based on attributes of the selected avatar.

8. The method of claim 1, wherein the avatar is capable of displaying multiple animations.

9. A system for generating user profile information, the system comprising:
- at least one processing device;
- a storage, the storage storing instructions that, when executed, cause the processing device to perform the following operations:
  - access a stored user profile corresponding to a user, the user profile including user profile data types and values of the user profile data types;
  - access an avatar selected to represent the user in an instant messaging exchange;
  - detect attributes of the selected avatar;
  - access a data structure that associates avatar attributes and user profile data types;
  - determine, based on associations in the accessed data structure, user profile data types that correspond to the detected attributes; and
  - based on results of the determining, update values of the user profile data types in the accessed user profile to reflect the detected attributes.

10. The system of claim 9, wherein the user profile data types in the accessed user profile include a name data type, a geographic location data type, a hobby and interest data type, and an occupation data type.

11. The system of claim 10, wherein the instructions that, when executed, cause the processing device to detect attributes of the selected avatar comprise instructions that, when executed, cause the processing device to:
- detect at least one of a geographic location associated with the selected avatar, a hobby or interest associated with the selected avatar, and an occupation associated with the selected avatar.

12. The system of claim 9, wherein the instructions that, when executed, cause the processing device to detect attributes of the selected avatar comprise instructions that, when executed, cause the processing device to:
- access a data structure that associates avatars and avatar attributes; and
- detect attributes of the selected avatar using the accessed data structure that associates avatars and avatar attributes.

13. The system of claim 9, wherein the instructions that, when executed, cause the processing device to access the stored user profile corresponding to a user include instructions that, when executed, cause the processing device to access the stored user profile to direct advertisements to the user.

14. The system of claim 13, wherein the instructions that, when executed, cause the processing device to accessing the stored user profile corresponding to a user include instructions that, when executed, cause the processing device to access the stored user profile only to direct advertisements to the user.

15. The system of claim 9, wherein the instructions that, when executed, cause the processing device to determine, based on associations in the accessed data structure, user profile data types comprise instructions that, when executed, cause the processing device to determine a user characteristic based on attributes of the selected avatar.

16. The system of claim 9, wherein the avatar is capable of displaying multiple animations.

* * * * *